US011601244B2

(12) United States Patent
Khoshnevisan et al.

(10) Patent No.: US 11,601,244 B2
(45) Date of Patent: Mar. 7, 2023

(54) SPACE DIVISION MULTIPLEXING MAPPING OF TRANSMISSION CONFIGURATION INDICATOR STATES TO A CONTROL CHANNEL

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/119,162

(22) Filed: Dec. 11, 2020

(65) Prior Publication Data

US 2021/0226754 A1 Jul. 22, 2021

Related U.S. Application Data

(60) Provisional application No. 62/962,019, filed on Jan. 16, 2020.

(51) Int. Cl.
*H04W 72/04* (2009.01)
*H04B 7/08* (2006.01)
(Continued)

(52) U.S. Cl.
CPC ......... *H04L 5/0051* (2013.01); *H04B 7/0697* (2013.01); *H04W 72/042* (2013.01); *H04W 72/044* (2013.01)

(58) Field of Classification Search
CPC . H04L 5/0023; H04L 27/2602; H04L 5/0094; H04L 5/0053; H04L 5/0051;
(Continued)

(56) References Cited

U.S. PATENT DOCUMENTS

2013/0230030 A1* 9/2013 Papasakellariou ..........................
H04W 72/0413
370/336
2013/0265955 A1* 10/2013 Kim ...................... H04L 5/0094
370/329

(Continued)

OTHER PUBLICATIONS

CMCC: "Discussion on DL Multi-TRP Transmission", 3GPP Draft, 3GPP TSG RAN WG1 Ad-Hoc Meeting 1901, R1 -1900418, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593332, 5 Pages, Retrieved from the Internet: URL: http://www.3gpp.org/ftp/Meetings%5F3GPP%5FSYNC/RAN1/Docs/R1%2D1900418%2Ezip. [retrieved on Jan. 20, 2019] Section "2 Discussion on PDCCH transmission".
(Continued)

*Primary Examiner* — Pankaj Kumar
*Assistant Examiner* — Kenneth P Hunt
(74) *Attorney, Agent, or Firm* — Holland & Hart LLP

(57) ABSTRACT

Methods, systems, and devices for wireless communications are described. A control resource set (CORESET) may be configured to support multiple transmission configuration indicator (TCI) state control channels. Space division multiplexing (SDM) may be implemented to enable multi-TCI states by using multiple ports and layers. A certain layer and demodulation reference signal (DMRS) port may be associated with a certain TCI state. For orthogonal ports, resources elements (REs) may be assigned such that a first set of REs are assigned to the first DMRS port and a second
(Continued)

set of REs are assigned to the second port. The multiple DMRS ports may be code division multiplexed (CDM'd) within an RE such that multiple DMRS ports may be associated with the same RE. For non-orthogonal ports, the same RE may be used for multiple TCI states, where scrambling sequences may be applied to DMRSs associated with the TCI states.

28 Claims, 18 Drawing Sheets

(51) Int. Cl.
 *H04L 5/00* (2006.01)
 *H04B 7/06* (2006.01)
 *H04W 72/044* (2023.01)

(58) Field of Classification Search
 CPC ... H04L 27/2613; H04L 5/0048; H04L 5/001; H04W 72/044; H04W 72/1289; H04W 16/28; H04W 72/046; H04B 7/0697; H04B 7/048; H04B 7/0617
 See application file for complete search history.

(56) References Cited

U.S. PATENT DOCUMENTS

| | | | | |
|---|---|---|---|---|
| 2016/0227520 A1* | 8/2016 | Davydov | ............. | H04B 7/0456 |
| 2020/0177306 A1* | 6/2020 | Choi | ................... | H04L 5/0094 |
| 2020/0359407 A1* | 11/2020 | Takeda | ................. | H04L 5/0094 |
| 2021/0226820 A1* | 7/2021 | Khoshnevisan | .... | H04W 72/042 |
| 2021/0227525 A1* | 7/2021 | Khoshnevisan | .... | H04W 72/042 |
| 2021/0227526 A1* | 7/2021 | Khoshnevisan | ...... | H04W 24/02 |
| 2021/0258928 A1* | 8/2021 | Khoshnevisan | ..... | H04B 7/0842 |
| 2021/0314927 A1* | 10/2021 | Noh | ..................... | H04B 7/0617 |

OTHER PUBLICATIONS

Huawei et al., "Enhancements on Multi-TRP/Panel Transmission", 3GPP Draft, 3GPP TSG RAN WG1 Ad-Hoc Meeting 1901, R1-1900017, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 20, 2019 (Jan. 20, 2019), XP051592944, 15 Pages, Retrieved from the Internet: URL:http://www.3gpp.org/ftp/Meetings%5F3GPP%5FSYNC/RAN1/Docs/R1%2D1900017%2Ezip [retrieved on Jan. 20, 2019], section 2.
International Search Report and Written Opinion—PCT/US2020/064901—ISA/EPO—dated Mar. 30, 2021.
LG Electronics: "Enhancements on Multi-TRP/Panel Transmission", F44 3GPP Draft, 3GPP TSG RAN WG1 #96, R1-1902091, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599786, 11 Pages, Retrieved from the Internet: URL: http://www.3gpp.org/ftp% 5Fran/WG1%5FRL1/TSGR1%5F96/Docs/R1%2D1902091% 2Ezip. [retrieved on Feb. 16, 2019] section 2.2; p. 5-p. 7.
ZTE: "Further Details on Multi-Beam/TRP Operation," 3GPP TSG RAN WG1 Meeting #99, R1-1911933, Reno, US, Nov. 18-22, 2019, Nov. 22, 2019 (Nov. 22, 2019), Section 2-4, 10 pages, XP051823114, Retrieved from the Internet: URL: https://ftp.3gpp.org/tsg_ran/WG1_RL1/TSGR1_99/Docs/R1-1911933.zip. [retrieved on Nov. 9, 2019].

* cited by examiner

SPACE DIVISION MULTIPLEXING MAPPING OF TRANSMISSION CONFIGURATION INDICATOR STATES TO A CONTROL CHANNEL

CROSS REFERENCE

The present application for patent claims the benefit of U.S. Provisional patent Application No. 62/962,019 by KHOSHNEVISAN et al., entitled "SPACE DIVISION MULTIPLEXING MAPPING OF TRANSMISSION CONFIGURATION INDICATOR STATES TO A CONTROL CHANNEL," filed Jan. 16, 2020, assigned to the assignee hereof, and expressly incorporated by reference herein.

TECHNICAL FIELD

The following relates generally to wireless communications and more specifically to space division multiplexing (SDM) mapping of transmission configuration indicator (TCI) states to a control channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device may attempt to decode (e.g., blind decode) a control channel (e.g., a physical downlink control channel (PDCCH)). The device may attempt to decode the control channel in a control resource set (CORESET) and may perform channel estimation based on decoding the control channel to identify channel characteristics associated with the control channel. In some cases, the device may attempt to decode and perform channel estimation of the control channel based on a transmission configuration indicator (TCI) state associated with the control channel. For example, the control channel may be associated with a TCI state, which may provide quasi-colocation information associated with one or more reference signals. The device may use the quasi-colocation information associated with the one or more reference signals to decode and perform channel estimation of the control channel. However, in some cases, the quasi-colocation information provided by a single TCI may be insufficient (e.g., when the control channel is associated with a poor channel quality).

SUMMARY

The described techniques relate to improved methods, systems, devices, and apparatuses that support space division multiplexing (SDM) mapping of transmission configuration indicator (TCI) states to a control channel. Generally, the described techniques provide for enhancing diversity and reliability and to enable a more robust communications system. To achieve such improvements, a physical downlink control channel (PDCCH) may be configured to support multiple TCI states. For example, two TCI states may be configured for a control resource set (CORESET) associated with the PDCCH.

A CORESET may include one or more resource elements (REs) that may be used to transmit demodulation reference signals (DMRSs) and coded bits of downlink control information (DCI). In some cases, SDM may be used to enable the multiple TCI states for a CORESET. As such, multiple (e.g., two) DMRS ports may be enabled for a PDCCH. Each DMRS port may be associated with a different layer. For example, a first layer and DMRS port may be associated with a first TCI state and a second layer and DMRS port may be associated with a second TCI state. The DMRS ports may be orthogonal or non-orthogonal. In the case of orthogonal DMRS ports, REs may be assigned such that a first set of REs of the resource element group (REG) are assigned to the first DMRS port and a second set of REs that are orthogonal to the first set are assigned to the second port. Additionally or alternatively, the multiple DMRS ports may be code division multiplexed (CDM'd) within an RE such that multiple DMRS ports may be associated with the same RE. In the case of non-orthogonal DMRS ports, the same RE may be used for multiple TCI states, where scrambling sequences may be applied to DMRSs associated with the TCI states.

A method of wireless communications at a user equipment (UE) is described. The method may include receiving a configuration message indicating that a control resource set for a downlink control channel is associated with a set of TCI states, identifying an association between resources of the control resource set and the set of TCI states based at least in part on a SDM mapping, and decoding the downlink control channel based at least in part on the SDM mapping.

An apparatus for wireless communications at a UE is described. The apparatus may include a processor, memory coupled with the processor, and instructions stored in the memory. The instructions may be executable by the processor to cause the apparatus to receive a configuration message indicating that a control resource set for a downlink control channel is associated with a set of TCI states, identify an association between resources of the control resource set and the set of TCI states based at least in part on a SDM mapping, and decode the downlink control channel based at least in part on the SDM mapping.

Another apparatus for wireless communications at a UE is described. The apparatus may include means for receiving a configuration message indicating that a control resource set for a downlink control channel is associated with a set of TCI states, identifying an association between resources of the control resource set and the set of TCI states based at least in part on a SDM mapping, and decoding the downlink control channel based at least in part on the SDM mapping.

A non-transitory computer-readable medium storing code for wireless communications at a UE is described. The code may include instructions executable by a processor to receive a configuration message indicating that a control resource set for a downlink control channel is associated with a set of TCI states, identify an association between resources of the control resource set and the set of TCI states based at least in part on a SDM mapping, and decode the downlink control channel based at least in part on the SDM mapping.

In some examples of the method, apparatuses, and non-transitory computer-readable medium described herein, identifying the association between resources of the control resource set and the set of TCI states may include operations, features, means, or instructions for identifying that the SDM mapping includes a first association between a first DMRS port and a first TCI state of the set of TCI states, and a second association between a second DMRS port and a second TCI state of the set of TCI states.

In some examples of the method, apparatuses, and non-transitory computer-readable medium described herein, the first DMRS port and the second DMRS port may be orthogonal.

In some examples of the method, apparatuses, and non-transitory computer-readable medium described herein, the first DMRS port and the second DMRS port may be non-orthogonal.

In some examples of the method, apparatuses, and non-transitory computer-readable medium described herein, identifying the association between resources of the control resource set and the set of TCI states may include operations, features, means, or instructions for identifying that a first one or more resource elements of a REG in the control resource set may be associated with a first DMRS port, identifying that a second one or more resource elements of the REG in the control resource set may be associated with a second DMRS port, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, the first one or more resource elements of the REG may be different from the second one or more resource elements of the REG.

In some examples of the method, apparatuses, and non-transitory computer-readable medium described herein, identifying the association between resources of the control resource set and the set of TCI states may include operations, features, means, or instructions for identifying that one or more resource elements of a REG in the control resource set may be associated with a first DMRS port, identifying that the one or more resource elements of the REG in the control resource set may be also associated with a second DMRS port, where the first DMRS port and the second DMRS port may be orthogonal via code-division multiplexing, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, receiving the configuration message further may include operations, features, means, or instructions for receiving an indication of whether different resource elements of a REG in the control resource set may be assigned to different DMRS ports or whether a same resource element of the REG may be assigned to two different DMRS ports.

In some examples of the method, apparatuses, and non-transitory computer-readable medium described herein, receiving the configuration message further may include operations, features, means, or instructions for receiving an indication of a number of DMRS ports configured for the control resource set.

In some examples of the method, apparatuses, and non-transitory computer-readable medium described herein, identifying the association between resources of the control resource set and the set of TCI states may include operations, features, means, or instructions for identifying that each REG in each symbol of the control resource set includes one or more resource elements that may be associated with a first DMRS port and one or more resource elements that are associated with a second DMRS port. In some cases, identifying the association between resources of the control resource set and the set of TCI states may include operations, features, means, or instructions for identifying that additional REGs in the control resource set also include resource elements that may be collectively associated with both the first DMRS port and the second DMRS port. In some cases, identifying the association between resources of the control resource set and the set of TCI states may include operations, features, means, or instructions for identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, identifying the association between resources of the control resource set and the set of TCI states may include operations, features, means, or instructions for identifying that each REG in a first symbol of the control resource set includes one or more resource elements that may be associated with a first DMRS port and one or more resource elements that are associated with a second DMRS port, identifying that additional REGs in additional symbols of the control resource set do not include resource elements assigned for DMRSs, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, a density of the one or more resource elements assigned for DMRSs in the REGs in the first symbol may be based at least in part on a number of symbols in the control resource set.

Some examples of the method, apparatuses, and non-transitory computer-readable medium described herein may further include operations, features, means, or instructions for identifying that at least one of the additional symbols of the control resource set includes at least one phase tracking reference signal (PTRS).

In some examples of the method, apparatuses, and non-transitory computer-readable medium described herein, the at least one PTRS includes a first PTRS associated with the first DMRS port and a second PTRS associated with the second DMRS port.

In some examples of the method, apparatuses, and non-transitory computer-readable medium described herein, receiving the configuration message further may include operations, features, means, or instructions for receiving an indication of whether the at least one PTRS may be for one port or two ports.

In some examples of the method, apparatuses, and non-transitory computer-readable medium described herein, receiving the configuration message further may include operations, features, means, or instructions for receiving an indication of a time-domain density of the at least one PTRS within the additional symbols of the control resource set.

In some examples of the method, apparatuses, and non-transitory computer-readable medium described herein, receiving the configuration message further may include operations, features, means, or instructions for receiving an indication of a frequency-domain density of the at least one PTRS within the additional REGs of the additional symbols of the control resource set.

In some examples of the method, apparatuses, and non-transitory computer-readable medium described herein, identifying the association between resources of the control resource set and the set of TCI states may include operations, features, means, or instructions for identifying that one or more resource elements of a REG in the control resource set may be associated with a first DMRS port, identifying that the one or more resource elements of the REG in the control resource set may be also associated with a second DMRS port, where the first DMRS port and the second DMRS port may be non-orthogonal but use different scrambling sequences, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, the different scrambling sequences may be based at least in part on a first DMRS scrambling identification that may be associated with the first TCI state and a second DMRS scrambling identification that may be associated with the second TCI state.

Some examples of the method, apparatuses, and non-transitory computer-readable medium described herein may further include operations, features, means, or instructions for receiving coded bits of the downlink control channel across a first layer and a second layer, where the first layer may be associated with a first TCI state and the second layer may be associated with a second TCI state.

Some examples of the method, apparatuses, and non-transitory computer-readable medium described herein may further include operations, features, means, or instructions for decoding the coded bits of DCI based at least in part on a scrambling sequence that was applied to the coded bits of DCI, where the scrambling sequence may be based at least in part on the layer across which the coded bits was received.

A method of wireless communications at a base station is described. The method may include identifying an association between resources of a control resource set for a downlink control channel and a set of TCI states for the control resource set based at least in part on a SDM mapping and transmitting a configuration message indicating that the control resource set is associated with the set of TCI states.

An apparatus for wireless communications at a base station is described. The apparatus may include a processor, memory coupled with the processor, and instructions stored in the memory. The instructions may be executable by the processor to cause the apparatus to identify an association between resources of a control resource set for a downlink control channel and a set of TCI states for the control resource set based at least in part on a SDM mapping and transmit a configuration message indicating that the control resource set is associated with the set of TCI states.

Another apparatus for wireless communications at a base station is described. The apparatus may include means for identifying an association between resources of a control resource set for a downlink control channel and a set of TCI states for the control resource set based at least in part on a SDM mapping and transmitting a configuration message indicating that the control resource set is associated with the set of TCI states.

A non-transitory computer-readable medium storing code for wireless communications at a base station is described. The code may include instructions executable by a processor to identify an association between resources of a control resource set for a downlink control channel and a set of TCI states for the control resource set based at least in part on a SDM mapping and transmit a configuration message indicating that the control resource set is associated with the set of TCI states.

In some examples of the method, apparatuses, and non-transitory computer-readable medium described herein, identifying the association between resources of the control resource set and the set of TCI states may include operations, features, means, or instructions for identifying that the SDM mapping includes a first association between a first DMRS port and a first TCI state of the set of TCI states, and a second association between a second DMRS port and a second TCI state of the set of TCI states.

In some examples of the method, apparatuses, and non-transitory computer-readable medium described herein, the first DMRS port and the second DMRS port may be orthogonal.

In some examples of the method, apparatuses, and non-transitory computer-readable medium described herein, the first DMRS port and the second DMRS port may be non-orthogonal.

In some examples of the method, apparatuses, and non-transitory computer-readable medium described herein, identifying the association between resources of the control resource set and the set of TCI states may include operations, features, means, or instructions for identifying that a first one or more resource elements of a REG in the control resource set may be associated with a first DMRS port, identifying that a second one or more resource elements of the REG in the control resource set may be associated with a second DMRS port, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, the first one or more resource elements of the REG may be different from the second one or more resource elements of the REG.

In some examples of the method, apparatuses, and non-transitory computer-readable medium described herein, identifying the association between resources of the control resource set and the set of TCI states may include operations, features, means, or instructions for identifying that one or more resource elements of a REG in the control resource set may be associated with a first DMRS port, identifying that the one or more resource elements of the REG in the control resource set may be also associated with a second DMRS port, where the first DMRS port and the second DMRS port may be orthogonal via code-division multiplexing, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, transmitting the configuration message further may include operations, features, means, or instructions for transmitting an indication of whether different resource elements of a REG in the control resource set may be assigned to different DMRS ports or whether a same resource element of the REG may be assigned to two different DMRS ports.

In some examples of the method, apparatuses, and non-transitory computer-readable medium described herein, transmitting the configuration message further may include operations, features, means, or instructions for transmitting an indication of a number of DMRS ports configured for the control resource set.

In some examples of the method, apparatuses, and non-transitory computer-readable medium described herein, identifying the association between resources of the control resource set and the set of TCI states may include operations, features, means, or instructions for identifying that a first REG in the control resource set includes resource elements that may be collectively associated with both a first DMRS port and a second DMRS port, identifying that additional REGs in the control resource set also include resource elements that may be collectively associated with both the first DMRS port and the second DMRS port, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, identifying the association between resources of the control resource set and the set of TCI states may include operations, features, means, or instructions for identifying that each REG in a first symbol of the control resource set includes resource elements that may be collectively associated with both a first DMRS port and a second DMRS port, identifying that additional REGs in additional symbols of the control resource set do not include resource elements assigned for DMRSs, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, a density of resource elements assigned for DMRSs in the REGs in the first symbol may be based at least in part on a number of symbols in the control resource set.

Some examples of the method, apparatuses, and non-transitory computer-readable medium described herein may further include operations, features, means, or instructions for identifying that at least one of the additional symbols of the control resource set includes at least one PTRS.

In some examples of the method, apparatuses, and non-transitory computer-readable medium described herein, the at least one PTRS includes a first PTRS associated with the first DMRS port and a second PTRS associated with the second DMRS port.

In some examples of the method, apparatuses, and non-transitory computer-readable medium described herein, transmitting the configuration message further may include operations, features, means, or instructions for transmitting an indication of whether the at least one PTRS may be for one port or two ports.

In some examples of the method, apparatuses, and non-transitory computer-readable medium described herein, transmitting the configuration message further may include operations, features, means, or instructions for transmitting an indication of a time-domain density of the at least one PTRS within the additional symbols of the control resource set.

In some examples of the method, apparatuses, and non-transitory computer-readable medium described herein, transmitting the configuration message further may include operations, features, means, or instructions for transmitting an indication of a frequency-domain density of the at least one PTRS within the additional REGs of the additional symbols of the control resource set.

In some examples of the method, apparatuses, and non-transitory computer-readable medium described herein, identifying the association between resources of the control resource set and the set of TCI states may include operations, features, means, or instructions for identifying that one or more resource elements of a REG in the control resource set may be associated with a first DMRS port, identifying that the one or more resource elements of the REG in the control resource set may be also associated with a second DMRS port, where the first DMRS port and the second DMRS port may be non-orthogonal but use different scrambling sequences, and identifying that the first DMRS port may be associated with a first TCI state of the set of TCI states and that the second DMRS port may be associated with a second TCI state of the set of TCI states.

In some examples of the method, apparatuses, and non-transitory computer-readable medium described herein, the different scrambling sequences may be based at least in part on a first DMRS scrambling identification that may be associated with the first TCI state and a second DMRS scrambling identification that may be associated with the second TCI state.

Some examples of the method, apparatuses, and non-transitory computer-readable medium described herein may further include operations, features, means, or instructions for transmitting coded bits of the downlink control channel across a first layer and a second layer, where the first layer may be associated with a first TCI state and the second layer may be associated with a second TCI state.

Some examples of the method, apparatuses, and non-transitory computer-readable medium described herein may further include operations, features, means, or instructions for applying a scrambling sequence to the coded bits of DCI based at least in part on the layer across which the coded bits may be transmitted.

DETAILED DESCRIPTION

Figure 1:
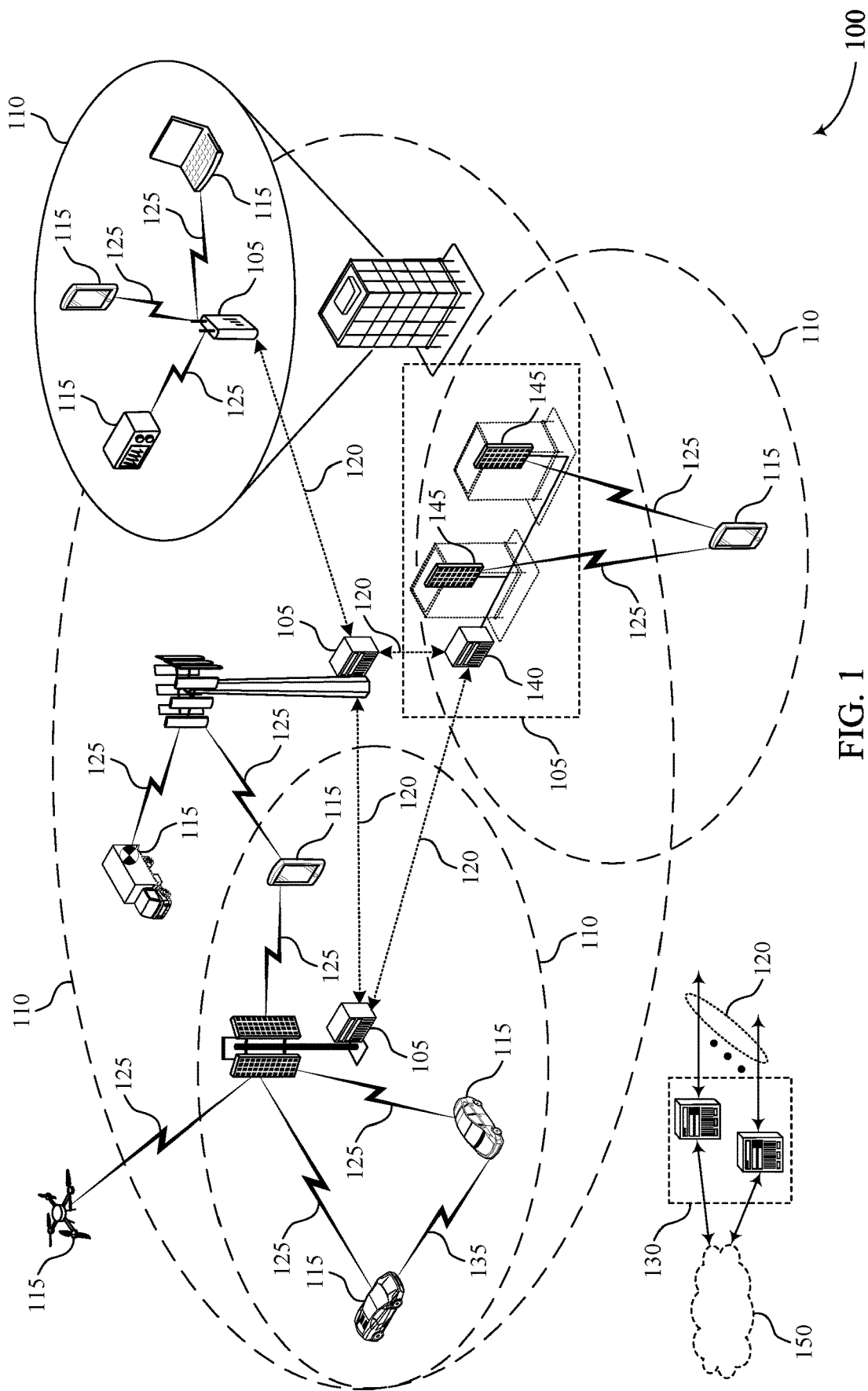
FIG. 1 illustrates an example of a system for wireless communications that supports space division multiplexing (SDM) mapping of transmission configuration indicator (TCI) states to a control channel in accordance with aspects of the present disclosure.

As demand for communication resources increases due to an increasing number of wireless devices communicating over the available spectrum, techniques to efficiently and reliably increase throughput are desirable. In some cases, the overall reliability of a wireless communications system may depend on the reliability of a number of different communication channels. For example, a wireless device, such as a user equipment (UE), may receive downlink data transmissions from a base station over a downlink data channel (e.g., a physical downlink shared channel (PDSCH)) and downlink control transmissions over a downlink control channel (e.g., a physical downlink control channel (PDCCH)) and the overall system reliability may depend on the reliability of both channels. In some cases, the reliability of the channels may be associated with a diversity of the channels. Accordingly, increasing the diversity of a channel may increase the reliability of the channel. In some cases, the diversity of a channel may be associated with a number of transmission configuration indicator (TCI) states associated with the channel. For instance, a downlink data channel may be configured for multi-TCI state operation such that different resources (e.g., spatial layers, resource blocks (RBs), orthogonal frequency division multiplexing (OFDM) symbols, or OFDM slots) associated with the downlink data channel may be associated with different TCI states. In some cases, downlink control information (DCI) may include a TCI field indicating the number of TCI states associated with the PDSCH. Accordingly, the PDSCH may feature enhanced diversity and reliability.

However, in some deployments, downlink control channels (e.g., resources associated with the downlink control channel) may be limited to a single TCI state with no mechanism for assigning the downlink control channel with multiple TCI states. As such, the downlink control channel may be associated with lower transmission diversity and may be less reliable than the PDSCH, which may limit the achievable efficiency and reliability of the overall wireless communications system.

Various implementations of the present disclosure relate generally to associating (e.g., defining or assigning) multiple TCI states to a downlink control channel based on a space division multiplexing (SDM) mapping.

In some wireless communications systems, a base station may transmit control information to a UE via a PDCCH using a control resource set (CORESET). A CORESET may include one or more resource element groups (REGs) that may include one or more resource elements (REs). A base station may transmit a PDCCH associated with a CORESET using one physical layer. In some cases, different spatial layers may be associated with different antenna ports. As such, a PDCCH may be associated with one antenna port and one TCI state. In some cases, a base station may transmit demodulation reference signals (DMRSs) in one or more REs of an REG, where the base station may transmit each PDCCH DMRS with the same antenna port associated with one TCI state.

In some cases, the UE may receive each DMRS in a PDCCH using the same TCI state. In the case of using one TCI state per PDCCH, the reliability of the network may rely on the reliability of each channel. To enhance diversity and reliability and enable a more robust communications system, a PDCCH may be configured to support more than one TCI state. In some cases, two TCI states may be assigned for a CORESET.

In some cases, SDM may be used to enable more than one TCI state for each CORESET. As such, multiple (e.g., two) DMRS ports may be enabled for a PDCCH. Each DMRS port may be associated with a different layer. For example, a first layer and DMRS port may be associated with a first TCI state and a second layer and DMRS port may be associated with a second TCI state. The DMRS ports may be orthogonal or non-orthogonal. In the case of orthogonal DMRS ports, REs may be assigned such that a first set of REs of the REG are assigned to the first DMRS port and a second set of REs, that are orthogonal to the first set, are assigned to the second port. Additionally or alternatively, the multiple DMRS ports may be code division multiplexed (CDM'd) within an RE such that multiple DMRS ports may be associated with the same RE. In the case of non-orthogonal DMRS ports, the same RE may be used for multiple TCI states, where scrambling sequences may be applied to DMRSs associated with the TCI states.

Particular implementations of the subject matter described in this disclosure can be implemented to realize one or more of the following potential advantages. In some implementations, the described techniques can be used to improve the diversity and reliability of a downlink control channel. For example, configuring (e.g., defining or assigning) multiple TCI states for a CORESET associated with a downlink control channel may provide a UE with additional quasi-colocation information, such as additional knowledge of quasi-colocated (QCL) reference signals. This may enable the UE to improve channel estimation for the downlink control channel and enhance the ability of the UE to accurately manage different reception beams used for receiving the downlink control channel. As such, the UE may be more likely to successfully receive and decode the downlink control channel, which may result in increased reliability of the downlink control channel and improve overall system efficiency. Furthermore, by increasing the reliability of the downlink control channel, the UE may perform fewer reception attempts of the downlink control channel. By reducing the number of reception attempts, the UE may additionally experience increased power savings associated with fewer monitoring occasions and decoding operations.

Aspects of the disclosure are initially described in the context of wireless communications systems. Aspects are then described with respect to CORESETs and a process flow. Aspects of the disclosure are further illustrated by and described with reference to apparatus diagrams, system diagrams, and flowcharts that relate to SDM mapping of TCI states to a control channel.

FIG. 1 illustrates an example of a wireless communications system 100 that supports SDM mapping of TCI states to a control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, or a video device), a camera, a gaming device, a navigation/positioning device (e.g., global navigation satellite system (GNSS) devices based on, for example, global positioning system (GPS), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, an RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

To enhance DMRS reliability and increase network robustness, a CORESET may be configured to support more than one TCI state for multi-TCI state PDCCH. In some cases, a UE 115 may receive a configuration message that indicates that a CORESET for a PDCCH may be associated with multiple TCI states. The UE 115 may identify an association between resources of the CORESET and the multiple TCI states based on SDM mapping. In some cases, the SDM mapping may indicate an association between a first DMRS port and a first TCI state and an association between a second DMRS port and a second TCI state. The first and second DMRS ports may be orthogonal or non-orthogonal. In the case of orthogonal DMRS ports, REs of the CORESET may be assigned such that a first set of REs are assigned to the first DMRS port and a second set of REs, that are orthogonal to the first set, are assigned to the second port. Additionally or alternatively, the base station may CDM multiple DMRSs associated with different DMRS ports and transmit the CDM'd DMRSs in an RE such that multiple DMRS ports may be used during the same RE. In the case of non-orthogonal DMRS ports, the same RE may be used for multiple TCI states, where scrambling sequences may be applied to DMRSs associated with the TCI states. The SDM techniques that enable multi-TCI state PDCCH, as described herein, may enhance DMRS diversity and improve reliability.

Figure 2:
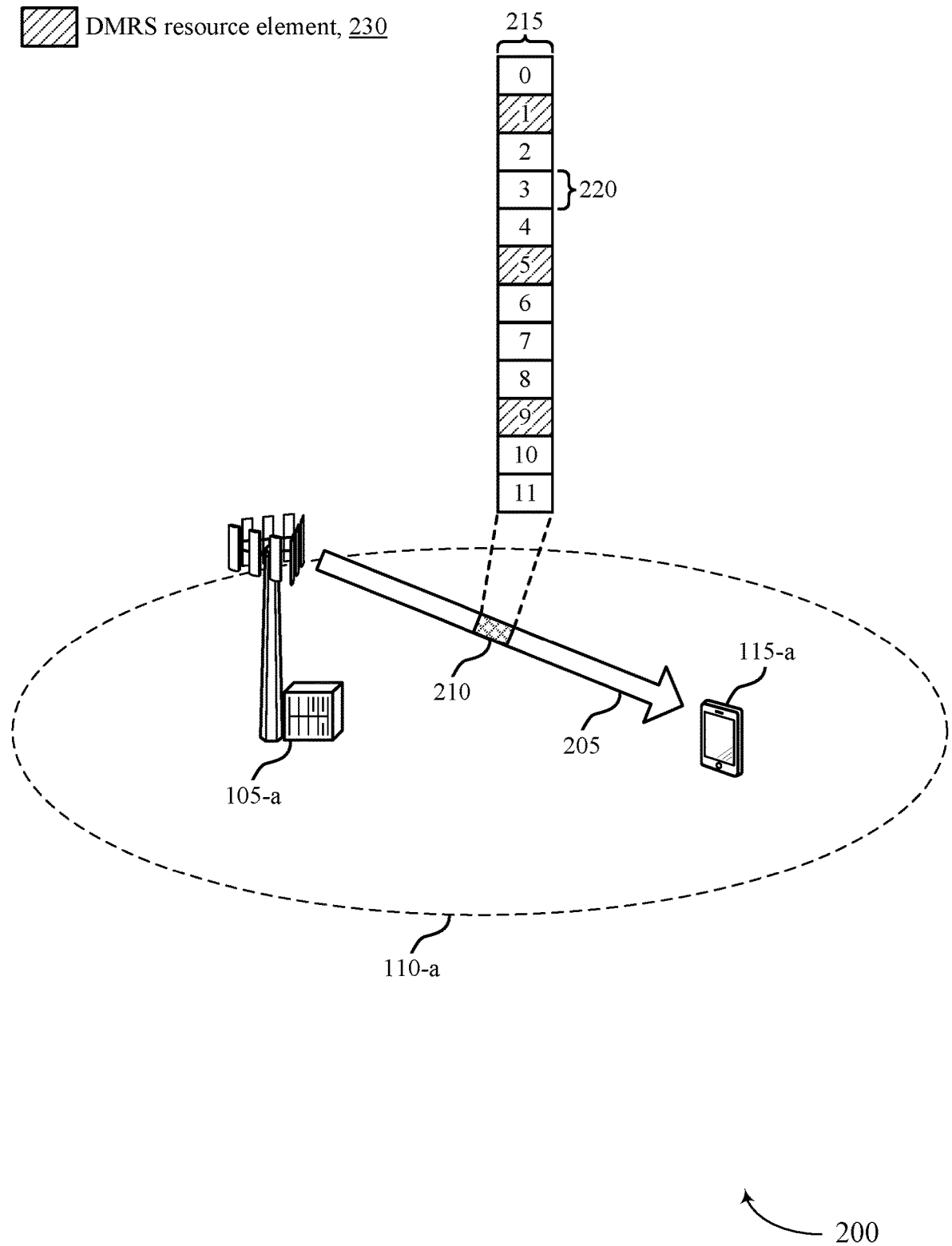
FIG. 2 illustrates an example of a system for wireless communications that supports SDM mapping of TCI states to a control channel in accordance with aspects of the present disclosure.

FIG. 2 illustrates an example of a wireless communications system 200 that supports SDM mapping of TCI states to a control channel in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may implement an SDM scheme for enabling multi-TCI state PDCCH. For example, base station 105-a may determine SDM mapping to support the transmission of PDCCH DMRSs over different DMRS ports and TCI states to improve DMRS reliability. Additionally or alternatively, other wireless devices, such as UE 115-a, may implement SDM schemes to enable multi-TCI PDCCH.

In some wireless communications systems, a base station 105 may transmit DCI to a UE 115 via a PDCCH such as through downlink communications link 205. Resources such as REs may be allocated for the PDCCH. The allocated REs may be part of a CORESET 210, where a CORESET 210 may include a complete set of resources for one or more PDCCH candidates. The CORESET 210 may include one or more REGs that may include one or more REs, where each RE is one OFDM symbol 215 in the time domain by one subcarrier 220 in the frequency domain. Each REG of a CORESET 210 includes twelve REs in one OFDM symbol in a single RB. In some cases, base station 105-a may use three of the twelve REs in an REG to transmit DMRSs. Base station 105-a may use the nine remaining REs to transmit coded bits of DCI. For example, CORESET 210 may include one or more control REs 225, and one or more DMRS REs 230. A control RE 225 may be allocated for coded DCI bits and a DMRS RE 230 may be allocated for DMRSs that the UE 115 may use for channel estimation purposes. In some cases, DMRS REs may be allocated to certain REs, such as REs 1, 5, and 9. In such a case, the DMRS density per an antenna port may be equal to ¼ (e.g., three DMRS REs of twelve total REs).

In some cases, a UE 115 (e.g., UE 115-a) may receive scheduling parameters for a PDSCH in DCI of a PDCCH. The scheduling parameters may include a TCI field that may indicate one or more TCI states for the PDSCH. Different TCI states, distinguished by different values of the TCI field, may correspond to QCL relationships with different reference signal transmissions. For example, each TCI state may be associated with one of the previously received reference signals. The TCI state may provide a spatial QCL reference that the UE 115 can use to set the receive beam. By configuring the TCI states at the UE 115, the base station 105 can dynamically select beams for downlink transmission to the UE 115, and the UE 115 can select the corresponding receive beam to receive the downlink transmission. For a downlink transmission, such as a PDSCH, base station 105-a may transmit an indication of the TCI state to UE 115-a, and UE 115-a may select the corresponding receive beam based on the indicated TCI state to receive the downlink transmission. The TCI states may be configured via higher layer signaling.

A multi-TCI state PDSCH may enhance diversity and reliability as compared to a single TCI state PDSCH. In some implementations, different spatial layers, RBs, or OFDM symbols or slots from PDSCH may have different TCI states which may enhance signaling diversity. In some cases, a PDCCH may be configured to support a single TCI state. In such cases, the overall reliability of the network may depend on the reliability of both downlink control channel and downlink data channel. To increase network robustness and improve reliability, a CORESET may be configured to support multi-TCI state PDCCH.

In some implementations, SDM techniques may be applied to support the multi-TCI state PDCCH. For example, an SDM scheme may include different TCI states within a single CORESET, where the TCI states may overlap in time, frequency, or both. In some cases, multiple (e.g., two) DMRS ports may be enabled for a PDCCH. Each DMRS port may be associated with a different layer. For example, a first layer and first DMRS port may be associated with a first TCI state and a second layer and second DMRS port may be associated with a second TCI state. The DMRS ports may be orthogonal or non-orthogonal to each other. In the case of orthogonal DMRS ports, REs may be assigned such that a first set of REs of the REG are assigned to the first DMRS port and a second set of REs, that are orthogonal to the first set, are assigned to the second port. Additionally or alternatively, the multiple DMRS ports may be CDM'd within one or more REs such that multiple DMRS ports and thus, multiple TCI states, may be associated with the same one or more REs. In the case of non-orthogonal DMRS ports, the same RE may be used for multiple TCI states, where scrambling sequences may be applied to DMRSs associated with the TCI states. Multiple ports may also be configured for control REs where control information may be transmitted over the multiple ports and layers. In some cases, the same control information or different control information may be transmitted simultaneously over the different ports.

Figure 3A:
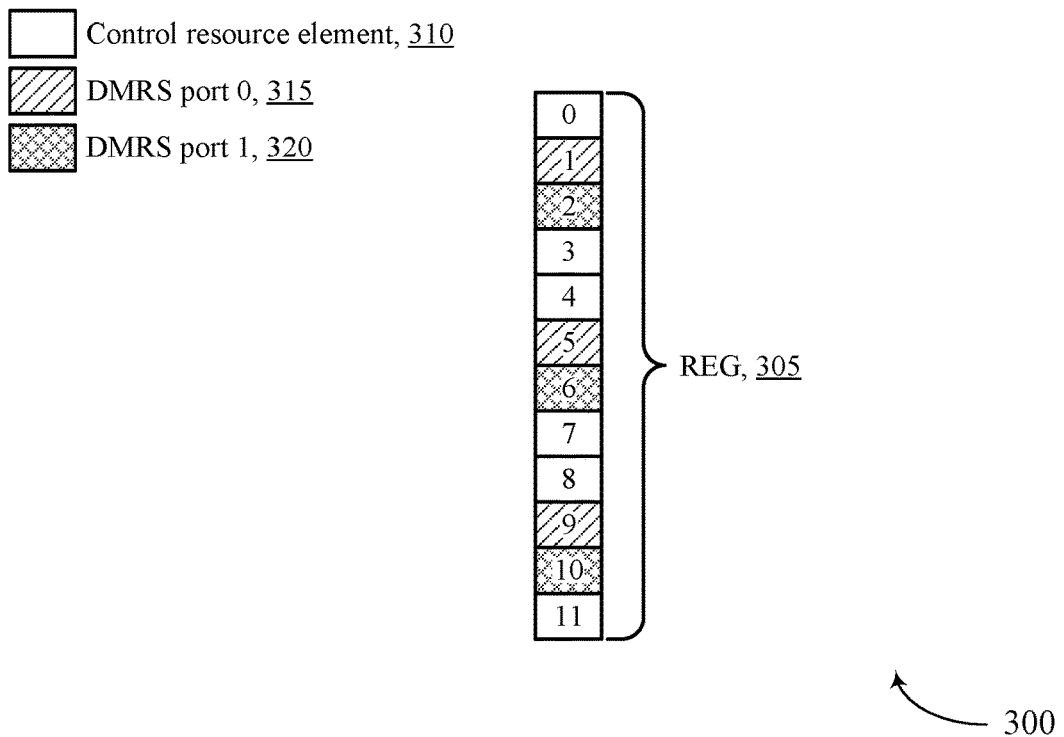
FIGS. 3A through 5 illustrate examples of CORESETs that supports SDM mapping of TCI states to a control channel in accordance with aspects of the present disclosure.
Figure 3B:
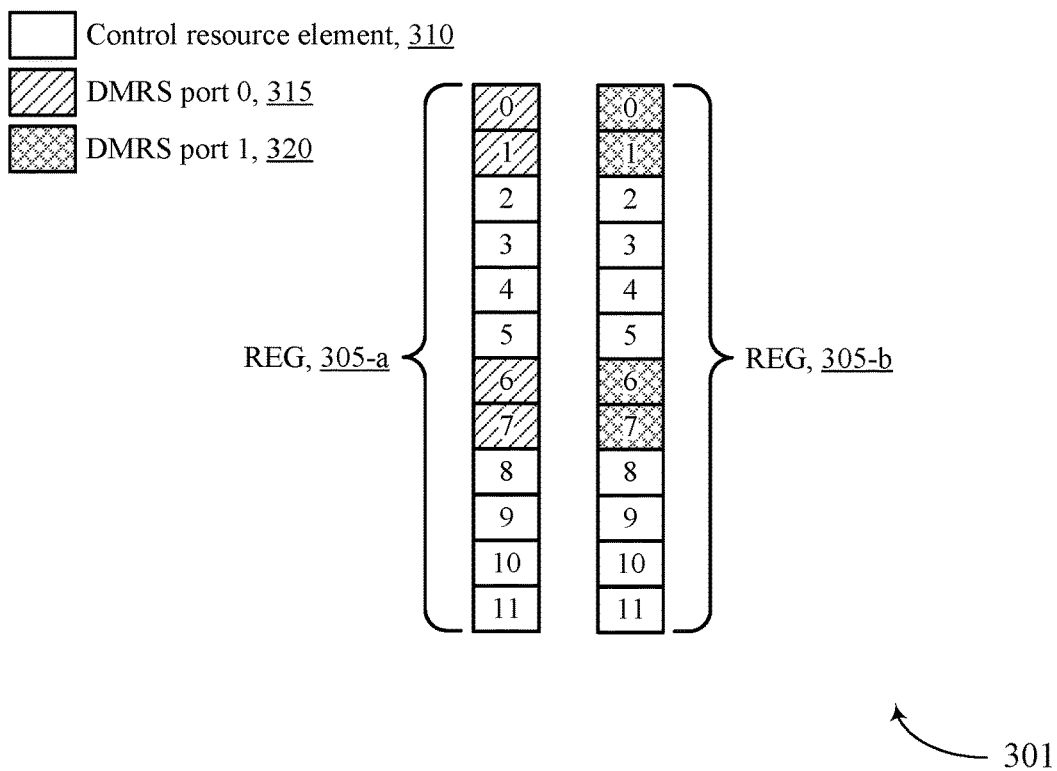

FIGS. 3A and 3B illustrate example CORESETs 300 and 301, respectively, that support SDM mapping of TCI states to a control channel in accordance with aspects of the present disclosure. The CORESETs 300 and 301 may be implemented by a base station or UE, which may be examples of a base station 105 and a UE 115 as described with reference to FIGS. 1 and 2. In some cases, CORESET 300 and CORESET 301 may be configured to support multi-TCI state PDCCH. For example, SDM techniques may be applied to CORESET 300 and 301 to support the transmission of PDCCH DMRSs over different DMRS ports and TCI states to enhance diversity of PDCCHs by allowing multiple beams or TCI states in one CORESET while also allowing for separate channel estimation for the two DMRS ports corresponding to the two TCI states.

To support a multi-TCI state PDCCH, SDM schemes may be implemented such that multiple orthogonal DMRS ports may be configured for the PDCCH, where each DMRS port may support a TCI state. In some cases, multiple layers may also be configured where each layer corresponds to a DMRS port. For example, a PDCCH may be configured with two DMRS antenna ports and two layers. A first layer may be associated with a first DMRS port and a second layer may be associated with a second DMRS port. Each DMRS port and layer may support a separate TCI state. For example, the first layer and DMRS port may be associated with a first TCI state, and the second layer and DMRS port may be associated with a second TCI state.

FIG. 3A illustrates a CORESET that supports multiple DMRS ports where the different DMRS ports are assigned to different REs of an REG 305. For example, a first set of REs are assigned to a first DMRS port and a second set of REs, that are orthogonal to the first set of REs, are assigned to the second DMRS port. In some cases, the DMRS ports that are configured for DMRS transmissions may be considered to be FDM'd. Any number of REs in any combination or order may be configured for DMRS port 0, DMRS port 1, or control information, or any combination thereof.

As described with reference to FIG. 2, each REG 305 in each OFDM symbol, may include DMRS REs. In some cases, REGs may be configured such that the DMRS RE density is ¼ per DMRS port. For example, an REG may include twelve REs and three of the REs (e.g., REs 1, 5, and 9) may be assigned for DMRS and the nine remaining REs may be assigned for coded bits of DCI. The number of coded bits that a base station 105 may transmit for DCI may be calculated by multiplying the number of control REs (e.g., non-DMRS REs), by the number of access layers, by the number of REGs in the CCE, by the QPSK, and by the number of physical layers. For example, for nine control REs (e.g., when the DMRS density is ¼), an access layer of 1, 6 REGs in a CCE, 2 QPSK, and 1 physical layer, the number of coded bits in the PDCCH is 108 (e.g., 9*1*6*2*1=108). As such, when the number of access layers increases, the number of coded bits may also increase. For example, while maintaining all other variables from the previous example, 2 access layers would provide 216 coded bits, 4 access layers would provide 432 coded bits, 8 access layers would provide 864 coded bits, and 16 access layers would provide 1728 coded bits. Increasing the number of physical layers may also increase the number of coded bits.

In the case of utilizing multiple physical layers and ports to support multi-TCI state PDCCH by assigning different REs to different DMRS ports, the DMRS overhead may increase and the number of coded bits may increase because the number of layers for each RE may increase. For example, each RE in the REG 305 may be assigned two layers. Each control RE 310 may utilize both layers, where the DMRS REs may utilize the layer that corresponds to the assigned DMRS port and TCI state. For example, as depicted in FIG. 3A, REG 305 may include twelve REs (e.g., REs 0 through 11). REs 1, 5, and 9 may be assigned to DMRS port 0 315 which may correspond to TCI state 1 and may be transmitted across a first layer. REs 2, 6, and 10 may be assigned to DMRS port 1 320 which may correspond to TCI state 2 and may be transmitted across a second layer. REs 0, 3, 4, 7, 8, and 11 may be control REs 310 that may be used for coded bits of DCI. Control REs 310 may be assigned and utilize two layers from TCI state 1 and TCI state 2. In such an example, the ¼ DMRS per port density did not change, but the DMRS overhead did because six total REs of the REG 305, rather than three, may be used. As the number of layers increased for each control RE 310, the number of coded bits may increase, even though the number of control REs 310 decreased from the single TCI state PDCCH configuration. For example, in the case of one layer and one DMRS as in the single TCI state PDCCH, 104 coded bits were possible. Instead, with two layers and two DMRS ports using six REs of the REG 305, the number of coded bits may equal 144 (e.g., 6*1*6*2*2=144).

FIG. 3B illustrates a CORESET that supports multiple DMRS ports where the different DMRS ports are assigned to the same REs of an REG 305. For example, a set of REs may be used by two different DMRS ports simultaneously through the use of orthogonal codes. For example, FIG. 3B depicts REG 305-*a* and REG 305-*b*. REG 305-*a* and REG 305-*b* may be the same REG 305 but are depicted separately for clarity. Within the same REs of REG 305, two DMRS ports may be configured. For example, REs 0, 1, 6, and 7 may be configured for DMRS using DMRS port 0 and a first layer corresponding to TCI state 1, as depicted by REG 305-*a*, and using DMRS port 1 320 and a second layer corresponding to TCI state 2, as depicted by REG 305-*b*. As REs 0, 1, 6, and 7 are configured for DMRSs, the DMRS density per port of REG 305 may be increased from ¼ to ⅓. Any number of REs in any combination or order may be configured for DMRS port 0, DMRS port 1, or control information, or any combination thereof.

To orthogonalize the DMRS ports, a frequency domain orthogonal cover code (FD-OCC) may be applied to the two ports such that the two DMRS ports may be CDM'd. CDMing is a multiple access technology where signals may be transmitted simultaneously but may be separated by unique orthogonal code. For example, the CDM code applied to REG 305-*a* may be all pluses such that a plus is applied to REs 0, 1, 6, 7 for DMRS port 0 315. The CDM code applied to REG 305-*b* may alternate between pluses and minuses for the DMRS REs such that a plus may be applied to REs 0 and 6 and a minus may be applied to REs 1 and 7 for DMRS port 1 320. CDMing multiple DMRS ports within the same RE, as compared to dividing the DMRS ports between REs as described with reference to FIG. 3A, the DMRS overhead may decrease because less REs are used for DMRSs.

A base station or UE may be configured to determine to implement the SDM techniques as described in FIG. 3A (e.g., DMRS ports assigned to different REs) or 3B (e.g., DMRS ports assigned to the same REs). For example, the SDM configuration may be include in an RRC message as part of the CORESET configuration information. In some cases, the number of DMRS ports may be configurable and may be indicated in the RRC as part of the CORESET configuration information.

Figure 4:
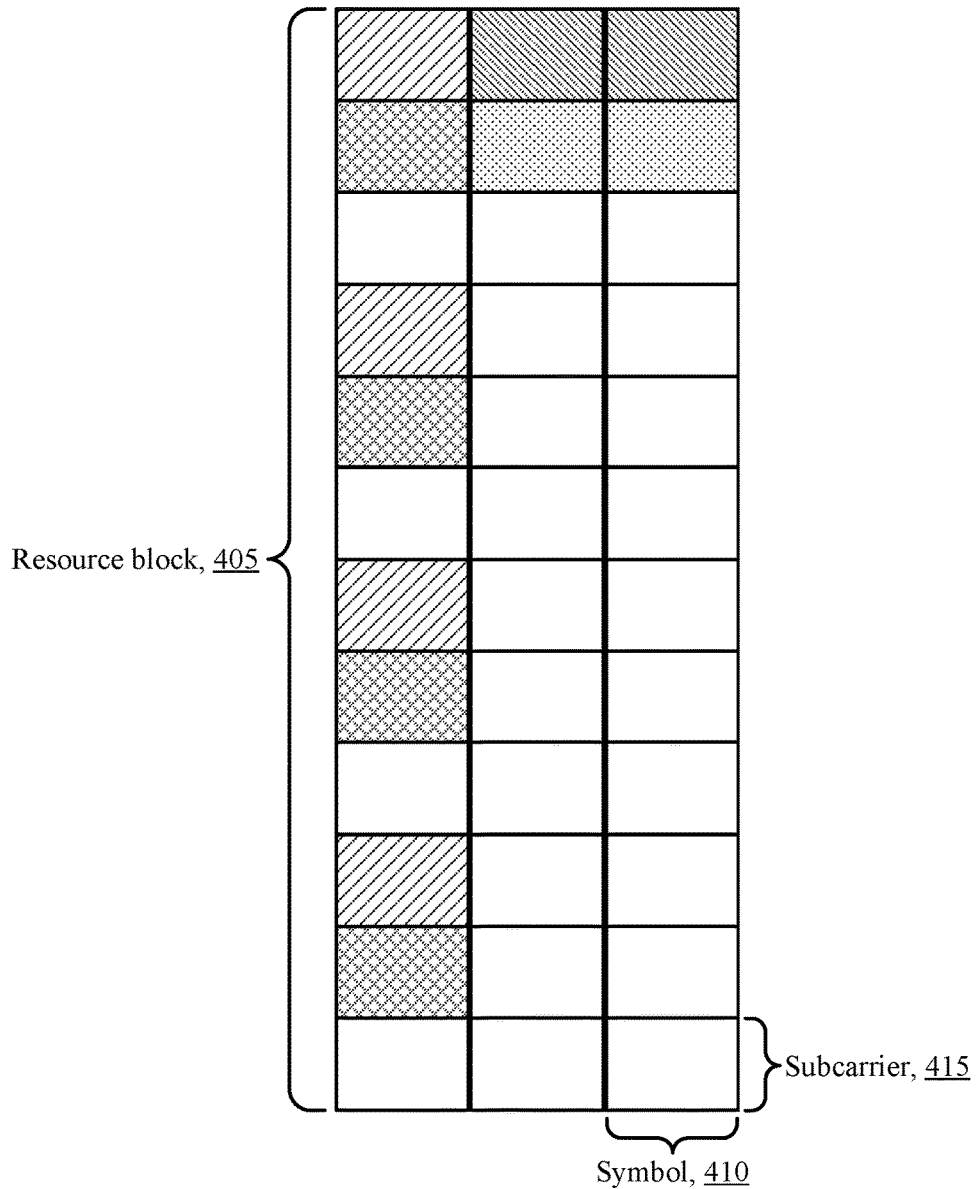

FIG. 4 illustrates an example of a CORESET 400 that supports SDM mapping of TCI states to a control channel in accordance with aspects of the present disclosure. The CORESET 400 may include an RB 405 including multiple subcarriers 415 in the frequency domain and may include multiple OFDM symbols 410 in the time domain. The CORESET 400 may be implemented by a base station or UE, which may be examples of a base station 105 and a UE 115 as described with reference to FIGS. 1 and 2. In some cases, CORESET 400 may be configured to support multi-TCI state PDCCH. For example, SDM techniques may be applied to CORESET 400 to support the transmission of PDCCH DMRSs over different DMRS ports and TCI states to improve DMRS reliability.

In some cases, a CORESET may include more than one symbol 410 and include multiple RBs out of which one RB 405 is illustrated, where an RB may be referred to as an REG and may include twelve REs or subcarriers 415. For example, CORESET 400 includes three symbols 410. In some cases, each REG (e.g., one symbol by one RB) of a CORESET 400 may include a DMRS. In this case, large DMRS overhead for the CORESET 400 may result. In some cases, a portion of the of REGs in a CORESET 400 contain DMRS, where some REGs may not contain DMRSs. For example, the REG in the first symbol of the CORESET 400 may include DMRS and the REGs in the following symbols may not include DMRSs, as depicted in FIG. 4. In such cases, more resources may be available for transmitting coded bits in control REs 420.

In some implementations, the DMRS density may be increased in the first symbol from ¼ DMRS density because the following symbols may not contain DMRS. In some cases, each RE in the first symbol may be allocated for DMRS transmission. As such, the number of coded bits that may be transmitted in the first symbol may decrease. In some cases, the DMRS density of the first symbol may remain ¼ while the proceeding symbols may not contain DMRS transmissions. The DMRS density in the first symbol, or proceeding symbols may be a function of the CORESET 400 duration. In some cases, the larger the duration (e.g., the more symbols in the CORESET 400), the more dense the DMRS REs in the first symbol may be. For example, the DMRS density may be smaller for a 1-symbol CORESET 400 than a 3-symbol CORESET 400 because coded bits of DCI still need to be transmitted in the 1-symbol CORESET 400.

In some implementations, the phase in the symbols may need to be corrected due to not transmitting DMRS in each symbol. To correct the phase in the proceeding symbols (e.g., the second and third symbol), one or more REs of the proceeding symbols may be configured to include phase tracking reference signals (PTRSs). PTRSs may utilize less frequency domain resources than DMRSs. As such, PTRSs may use less overhead compared to DMRSs. In some cases, one port may be configured for PTRS for PDCCH. In some cases, two or more ports may be configured for PTRS for PDCCH. The configuration for the PTRS, such as the number of ports, configured REs, or RE pattern may be identified in the CORESET configuration of the RRC.

In the two PTRS port case, a first port may be associated with a first DMRS port that corresponds to the first TCI state, and a second PTRS port may be associated with a second DMRS port that corresponds to the second TCI state. For example, CORESET 400 may include 3-symbols. The first symbol may include more than one DMRS RE such as four REs configured for DMRS port 0 425, and four REs configured for DMRS port 1 430, where the per port DMRS density is ⅓ for each port. The per port DMRS density may be higher or lower than ⅓. In some cases, the per port DMRS density may be the same or different between different RBs 405. The second symbol may have two REs configured for PTRS transmissions such as through PTRS port 0 435 and PTRS port 1 440, where PTRS port 0 435 may be associated with DMRS port 0 425 and PTRS port 1 440 may be associated with DMRS port 1 440. The third symbol may have two REs configured for PTRS transmissions such as through PTRS port 0 425 and PTRS port 1 440.

In some implementations, the PTRS density in the time domain, such as the number of PTRS REs in the second and third symbols, or the number of PTRS REs in just the second symbol or just the third symbol may be configurable. For example, the CORESET configuration of an RRC message may indicate that the second and third symbol contain four PTRS REs and that two are configured in the second symbol and two are configured in the third symbol, as depicted in FIG. 4 where the second symbol includes 2 REs configured for PTRS transmissions and the third symbol includes 2 REs configured for PTRS transmissions. In some implementations, the PTRS density in the frequency domain may be configurable (e.g., in the CORESET configuration of an RRC message), or may be a function of the number of RBs of the CORESET, or a combination thereof. For example, the number of PTRS REs in the frequency domain may be defined such that per every K RBs (e.g., K=1, 2, 4) there are x PTRS REs. Additionally or alternatively, the number of PTRS REs may be defined based on REs (e.g., per K REs there are x PTRS REs).

Figure 5:
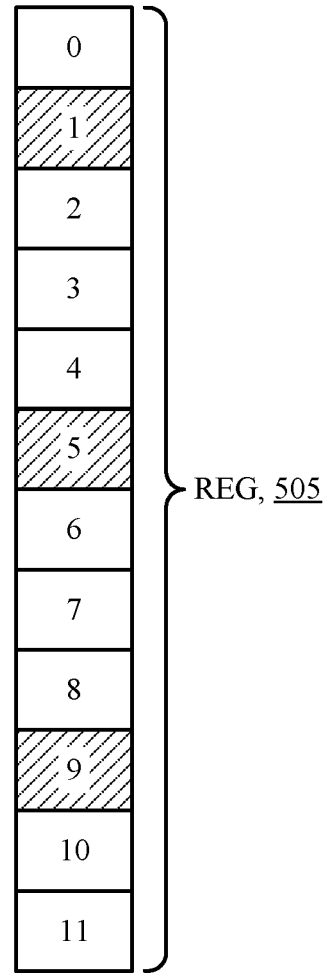

FIG. 5 illustrates an example of a CORESET 500 that supports SDM mapping of TCI states to a control channel in accordance with aspects of the present disclosure. The CORESET 500 may include multiple REs in the frequency domain and may include multiple OFDM symbols in the time domain. The CORESET 500 may be implemented by a base station or UE, which may be examples of a base station 105 and a UE 115 as described with reference to FIGS. 1 and 2. In some cases, CORESET 500 may be configured to support multi-TCI state PDCCH. For example, SDM techniques may be applied to CORESET 500 to support the transmission of PDCCH DMRSs over different DMRS ports and TCI states to improve DMRS reliability.

To support a multi-TCI state PDCCH, SDM schemes may be implemented such that multiple non-orthogonal DMRS ports may be configured for the PDCCH, where each DMRS port may support a TCI state. Each DMRS port may be associated with a different TCI state. For example, a first DMRS port may be associated with a first TCI state and second DMRS port may be associated with a second TCI state.

In some cases, the same RE may be used for a PDCCH DMRS across the two TCI states. For example, REG 505 may include twelve REs, such as control REs 510 and REs configured for DMRS transmissions through DMRS ports 0 and 1 515. To differentiate the DMRSs across the multiple ports and TCI states, a scrambling sequence may be applied to the DMRS based on the port or layer used to transmit the DMRS. In some cases, there may be a separation across the multiple antenna panels that a UE may use to receive the PDCCH, where the two panels may correspond to the each of the multiple TCI states.

In some implementations, DCI in a CORESET may include a scrambling ID for the PDCCH DMRS (e.g., pdcch-DMRS-ScramblingID). The scrambling ID may be used for PDCCH scrambling initialization. In some cases, the same value that is used for scrambling initialization may be used for coded bits of DCI. In some cases, the scrambling ID may not be configured, and a UE may instead use a physical cell identifier (PCI) of the serving cell from scrambling initialization. In some cases, the same scrambling ID that would be indicated in the CORESET may be associated with TCI state 1 such that the DMRS transmitted over port 0 associated with TCI state 1 may be scrambled according to the existing scrambling ID. In some cases, a new scrambling ID (e.g., a new pdcch-DMRS-ScramblingID) may be configured for TCI state 2 such that the DMRS transmitted over port 1 associated with TCI state 2 may be scrambled according to the new scrambling ID. The scrambling IDs may also be used to scramble coded bits of DCI transmitted in control REs 510. The coded bits of DCI may be scrambled based on the layer across which the coded bits are transmitted, where the layer across which the bits are transmitted may be associated with a TCI state.

Figure 6:
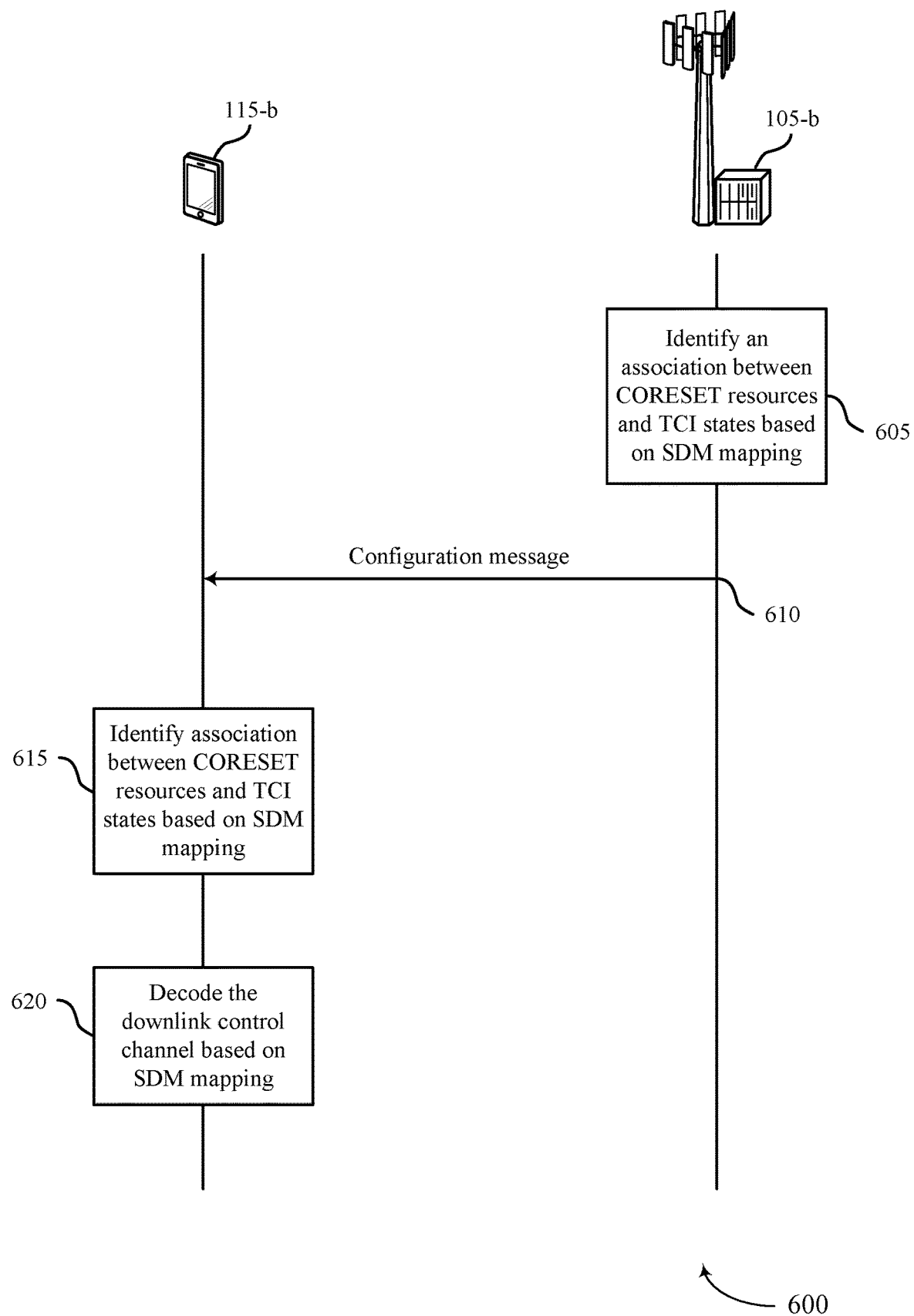
FIG. 6 illustrates an example of a process flow that supports SDM mapping of TCI states to a control channel in accordance with aspects of the present disclosure.

FIG. 6 illustrates an example of a process flow 600 that supports SDM mapping of TCI states to a control channel in accordance with aspects of the present disclosure. The process flow 600 may illustrate an example PDCCH configuration procedure based on an SDM scheme. For example, base station 105-*b* may indicate a multi-TCI state PDCCH configuration to UE 115-*b*. Base station 105-*b* and UE 115-*b* may be examples of the corresponding wireless devices described with reference to FIGS. 1 through 5. In some cases, instead of base station 105-*b* implementing the PDCCH configuration, a different type of wireless device (e.g., a UE 115) may configure the multi-TCI state PDCCH. Alternative examples of the following may be implemented, where some steps are performed in a different order than described or are not performed at all. In some cases, steps may include additional features not mentioned below, or further steps may be added.

At 605, base station 105-*b* may identify an association between resources of a CORESET for a downlink control channel and a plurality of TCI states for the CORESET based on an SDM mapping.

At 610, base station 150-*b* may transmit to UE 115-*b* a configuration message indicating that a CORESET for a downlink control channel is associated with a plurality of TCI states.

At 615, UE 115-*b* may identify an association between resources of the CORESET and the plurality of TCI states based on an SDM mapping. In some cases, identifying that the SDM mapping includes a first association between a first DMRS port and a first TCI state of the plurality of TCI states, and a second association between a second DMRS port and a second TCI state of the plurality of TCI states. In some cases, the first DMRS port and the second DMRS port are orthogonal. In some cases, the first DMRS port and the second DMRS port are non-orthogonal.

In some cases, UE 115-b may identify that a first one or more REs of an REG in the CORESET are associated with a first DMRS port, identify that a second one or more REs of the REG in the CORESET are associated with a second DMRS port, and identify that the first DMRS port is associated with a first TCI state of the plurality of TCI states and that the second DMRS port is associated with a second TCI state of the plurality of TCI states. In some cases, the first one or more RSs of the REG are different form the second one or more REs of the REG, as described with reference to FIG. 3A.

In some cases, UE 115-b may identify that one or more REs of an REG in the CORESET are associated with a first DMRS port, identify that the one or more REs of the REG in the CORESET are also associated with a second DMRS port, where the first DMRS port and the second DMRS port are orthogonal via code-division multiplexing, and identify that the first DMRS port is associated with a first TCI state of the plurality of TCI states and that the second DMRS port is associated with a second TCI state of the plurality of TCI states. In some implementations, the same RE of the REG may be assigned to different DMRS ports. In some implementations, different REs of the REG may be assigned to different DMRS ports. In some cases, the DMRS ports assigned to the same RE may be orthogonal or non-orthogonal. In the case of orthogonal DMRS ports within the same RE, the DMRS ports may be CDM'd. In the case of non-orthogonal DMRS ports within the same RE, the DMRS ports may be scrambled via a scrambling ID.

At 620, UE 115-b may decode the downlink control channel based on the SDM mapping.

Figure 7:
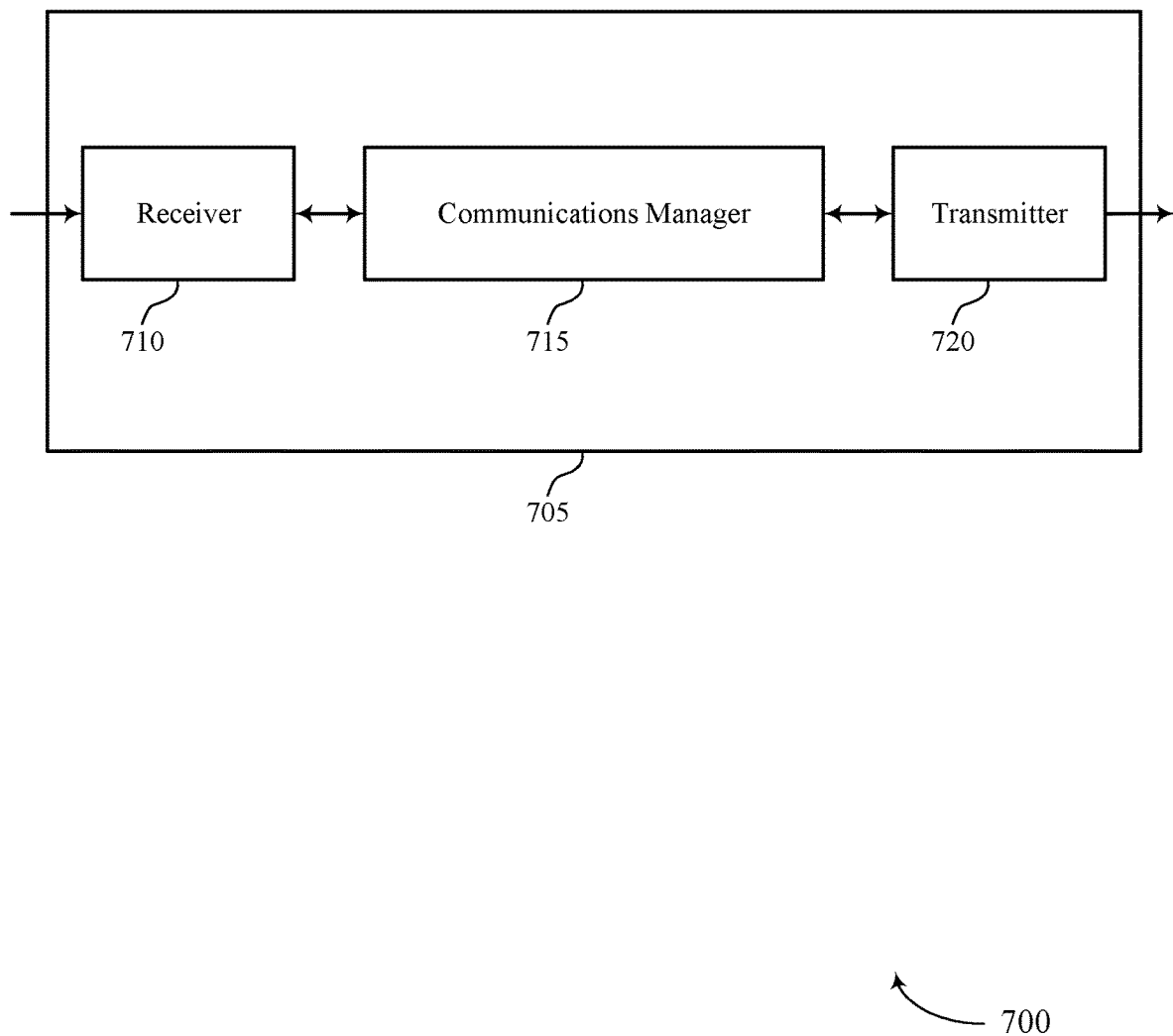
FIGS. 7 and 8 show block diagrams of devices that support SDM mapping of TCI states to a control channel in accordance with aspects of the present disclosure.

FIG. 7 shows a block diagram 700 of a device 705 that supports SDM mapping of TCI states to a control channel in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to SDM mapping of TCI states to a control channel). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a configuration message indicating that a CORESET for a downlink control channel is associated with a set of TCI states, identify an association between resources of the CORESET and the set of TCI states based at least in part on an SDM mapping, and decode the downlink control channel based at least in part on the SDM mapping. The communications manager 715 may be an example of aspects of the communications manager 1010 described herein.

The communications manager 715, or its sub-components, may be implemented in hardware, software (e.g., executed by a processor), or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The communications manager 715 as described herein may be implemented to realize one or more potential advantages. One implementation may allow the device 705 to more reliably receive a downlink control channel. For example, multiple TCI states may be configured for a CORESET associated with a downlink control channel which may provide the device 705 with additional quasi-colocation information, such as additional knowledge of QCL'd reference signals. This may enable the device 705 to improve channel estimation for the downlink control channel and enhance the ability of the device 705 to accurately manage different reception beams used for receiving the downlink control channel.

Based at least in part on implementing the multi-TCI state configuration techniques as described herein, a processor of a UE 115 (e.g., controlling the receiver 710, the transmitter 720, or the transceiver 1020 as described with reference to FIG. 10) may increase reliability and efficiency in the communication of downlink control channels.

Figure 8:
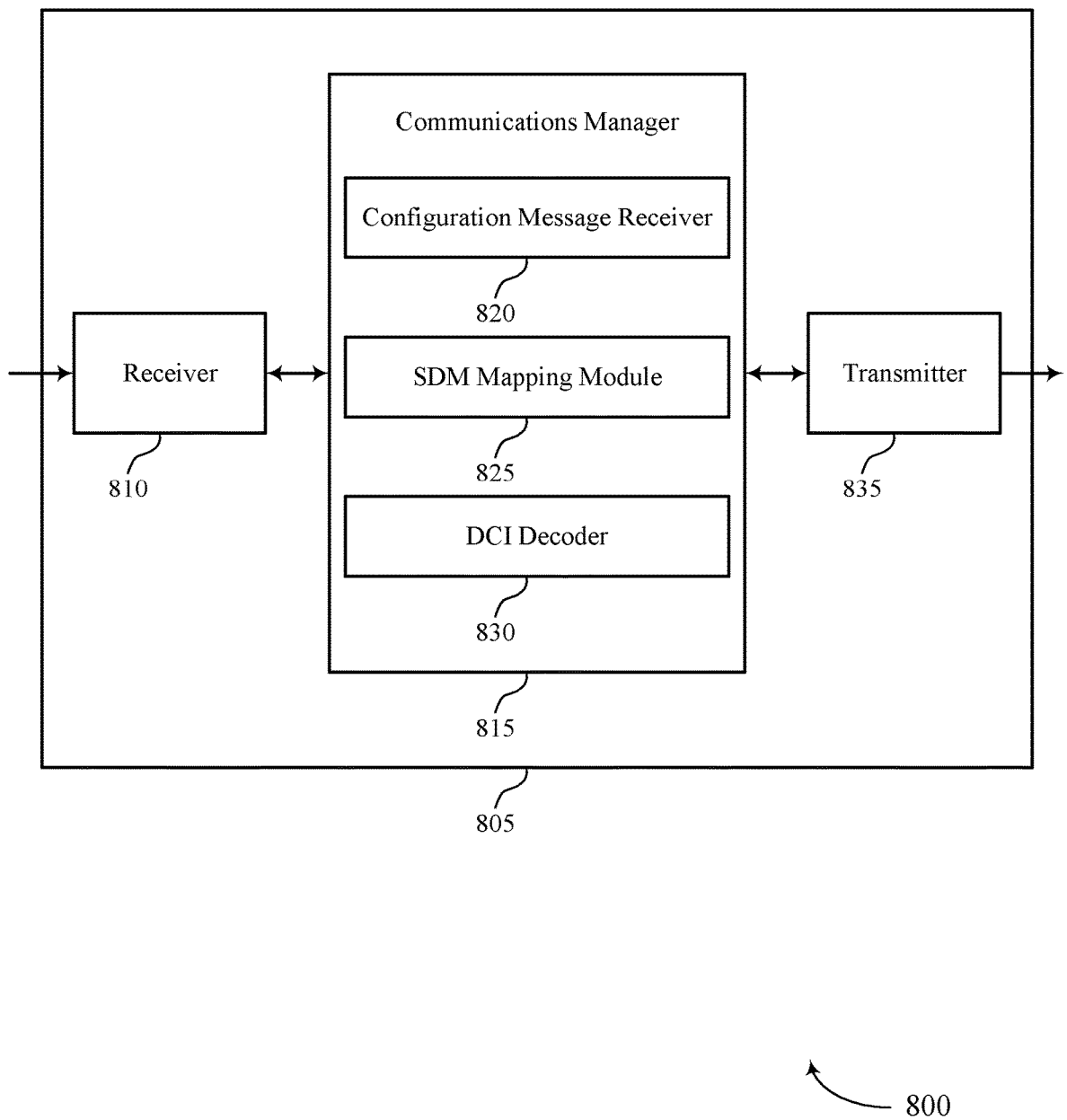

FIG. 8 shows a block diagram 800 of a device 805 that supports SDM mapping of TCI states to a control channel in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to SDM mapping of TCI states to a control channel). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration message receiver 820, an SDM mapping module 825, and a DCI decoder 830. The communications manager 815 may be an example of aspects of the communications manager 1010 described herein.

The configuration message receiver 820 may receive a configuration message indicating that a CORESET for a downlink control channel is associated with a set of TCI states. The SDM mapping module 825 may identify an association between resources of the CORESET and the set of TCI states based at least in part on an SDM mapping. The DCI decoder 830 may decode the downlink control channel based at least in part on the SDM mapping.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
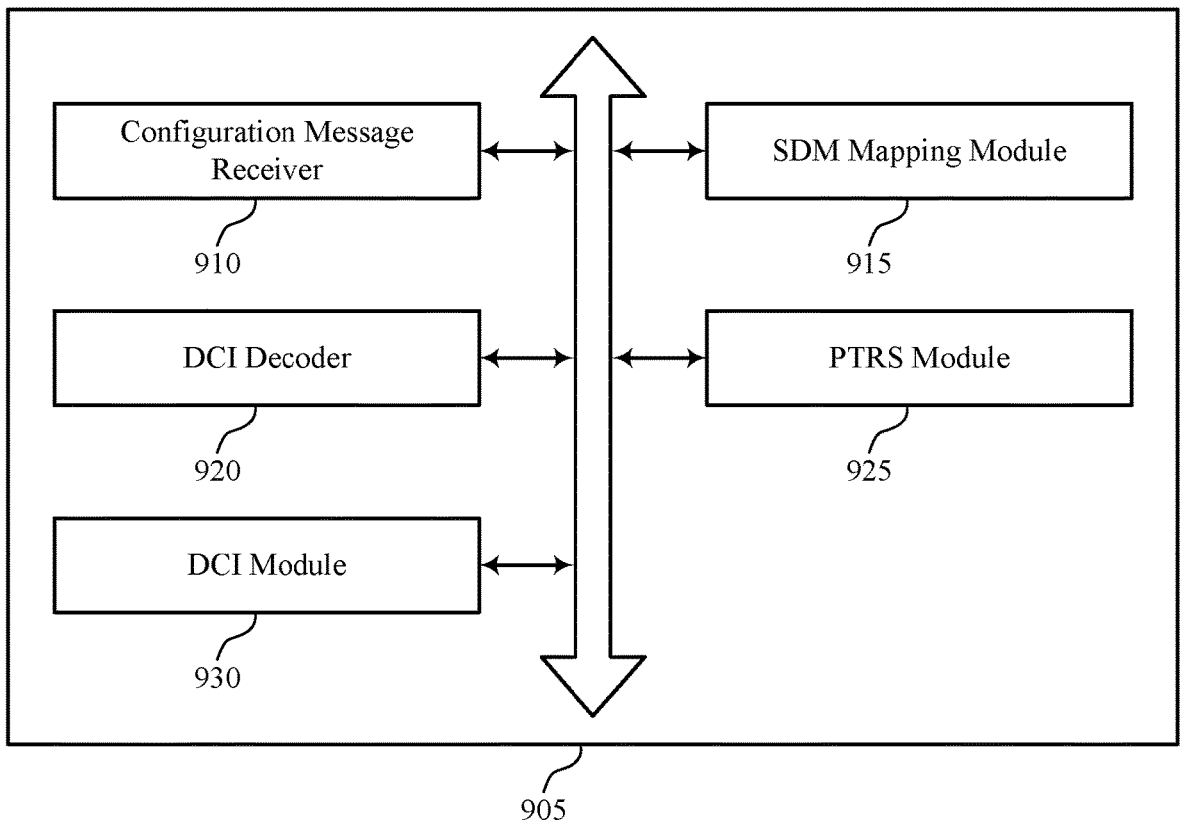
FIG. 9 shows a block diagram of a communications manager that supports SDM mapping of TCI states to a control channel in accordance with aspects of the present disclosure.

FIG. 9 shows a block diagram 900 of a communications manager 905 that supports SDM mapping of TCI states to a control channel in accordance with aspects of the present disclosure. The communications manager 905 may be an example of aspects of a communications manager 715, a communications manager 815, or a communications manager 1010 described herein. The communications manager 905 may include a configuration message receiver 910, an SDM mapping module 915, a DCI decoder 920, a PTRS module 925, and a DCI module 930. Each of these modules may communicate, directly or indirectly, with one another (e.g., via one or more buses).

The configuration message receiver 910 may receive a configuration message indicating that a CORESET for a downlink control channel is associated with a set of TCI states. In some examples, the configuration message receiver 910 may receive an indication of whether different REs of an REG in the CORESET are assigned to different DMRS ports or whether a same RE of the REG is assigned to two different DMRS ports. In some examples, the configuration message receiver 910 may receive an indication of a number of DMRS ports configured for the CORESET.

The SDM mapping module 915 may identify an association between resources of the CORESET and the set of TCI states based at least in part on an SDM mapping. In some examples, identifying that the SDM mapping includes a first association between a first DMRS port and a first TCI state of the set of TCI states, and a second association between a second DMRS port and a second TCI state of the set of TCI states.

In some examples, the SDM mapping module 915 may identify that a first one or more REs of an REG in the CORESET are associated with a first DMRS port. In some examples, the SDM mapping module 915 may identify that a second one or more REs of the REG in the CORESET are associated with a second DMRS port. In some examples, the SDM mapping module 915 may identify that the first DMRS port is associated with a first TCI state of the set of TCI states and that the second DMRS port is associated with a second TCI state of the set of TCI states.

In some examples, the SDM mapping module 915 may identify that one or more REs of an REG in the CORESET are associated with a first DMRS port. In some examples, the SDM mapping module 915 may identify that the one or more REs of the REG in the CORESET are also associated with a second DMRS port, where the first DMRS port and the second DMRS port are orthogonal via code-division multiplexing. In some examples, the SDM mapping module 915 may identify that each element group in each symbol of the CORESET includes one or more REs that are associated with a first DMRS port and one or more REs that are associated with a second DMRS port.

In some examples, the SDM mapping module 915 may identify that additional REGs in the CORESET also include REs that are collectively associated with both the first DMRS port and the second DMRS port. In some examples, the SDM mapping module 915 may identify that each REG in a first symbol of the CORESET includes one or more REs that are associated with a first DMRS port and one or more REs that are associated with a second DMRS port.

In some examples, the SDM mapping module 915 may identify that additional REGs in additional symbols of the CORESET do not include REs assigned for DMRSs. In some examples, the SDM mapping module 915 may identify that the one or more REs of the REG in the CORESET are also associated with a second DMRS port, where the first DMRS port and the second DMRS port are non-orthogonal but use different scrambling sequences.

In some cases, the first DMRS port and the second DMRS port are orthogonal. In some cases, the first DMRS port and the second DMRS port are non-orthogonal. In some cases, the first one or more REs of the REG are different from the second one or more REs of the REG. In some cases, a density of the one or more REs assigned for DMRSs in the REGs in the first symbol is based at least in part on a number of symbols in the CORESET. In some cases, the at least one PTRS includes a first PTRS associated with the first DMRS port and a second PTRS associated with the second DMRS port. In some cases, the different scrambling sequences are based at least in part on a first DMRS scrambling identification that is associated with the first TCI state and a second DMRS scrambling identification that is associated with the second TCI state.

The DCI decoder 920 may decode the downlink control channel based at least in part on the SDM mapping. The PTRS module 925 may identify that at least one of the additional symbols of the CORESET includes at least one PTRS. In some examples, the PTRS module 925 may receive an indication of whether the at least one PTRS is for one port or two ports.

In some examples, the PTRS module 925 may receive an indication of a time-domain density of the at least one PTRS within the additional symbols of the CORESET. In some examples, the PTRS module 925 may receive an indication of a frequency-domain density of the at least one PTRS within the additional REGs of the additional symbols of the CORESET.

The DCI module 930 may receive coded bits of a downlink control channel across a first layer and a second layer, where the first layer is associated with a first TCI state and the second layer is associated with the second TCI state. In some examples, the DCI module 930 may decode the coded bits of DCI based at least in part on a scrambling sequence that was applied to the coded bits of DCI, where the scrambling sequence is based at least in part on the layer across which the coded bits was received.

Figure 10:
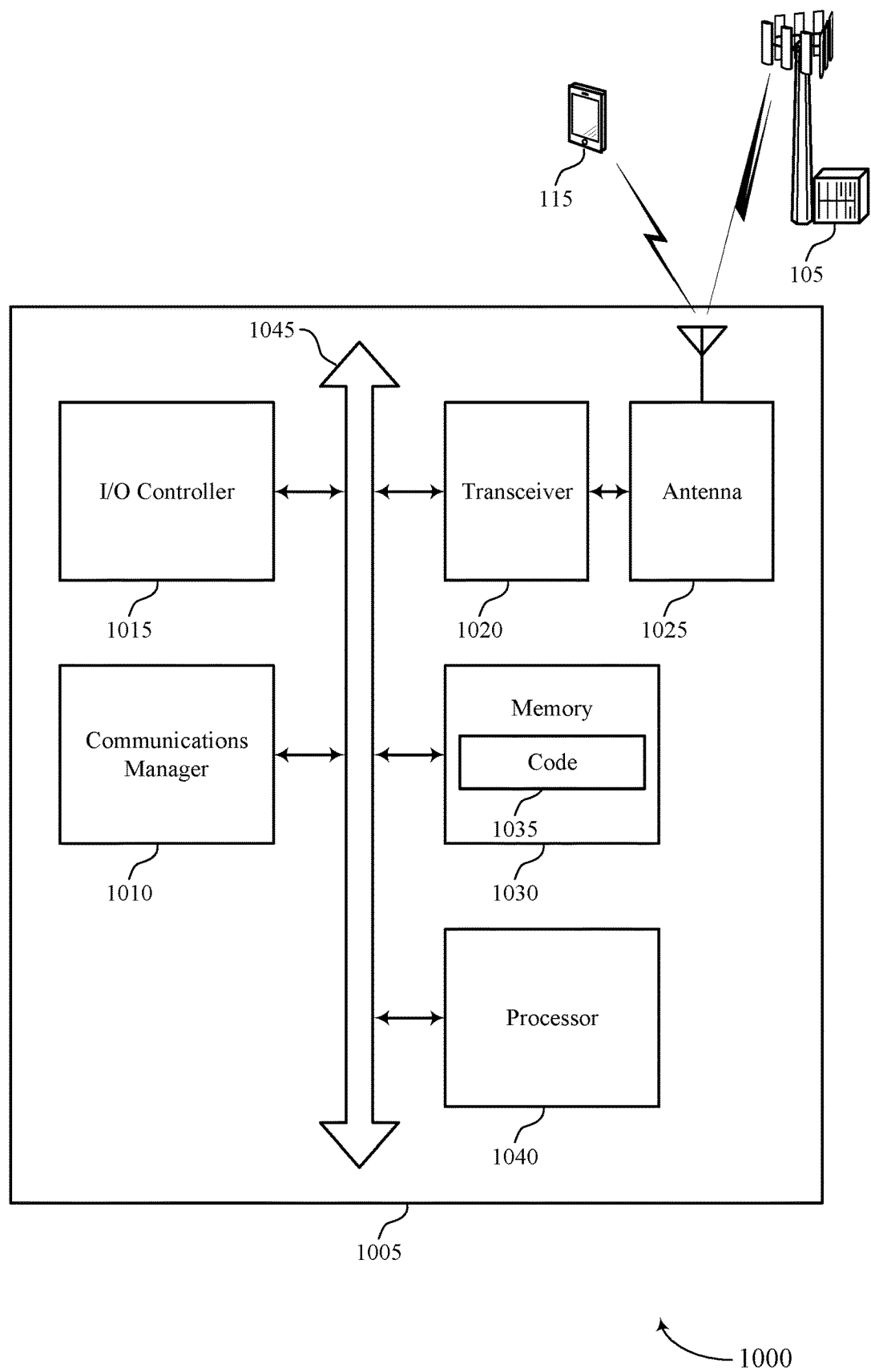
FIG. 10 shows a diagram of a system including a device that supports SDM mapping of TCI states to a control channel in accordance with aspects of the present disclosure.

FIG. 10 shows a diagram of a system 1000 including a device 1005 that supports SDM mapping of TCI states to a control channel in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a configuration message indicating that a CORESET for a downlink control channel is associated with a set of TCI states, identify an association between resources of the CORESET and the set of TCI states based at least in part on an SDM mapping, and decode the downlink control channel based at least in part on the SDM mapping.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting SDM mapping of TCI states to a control channel).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
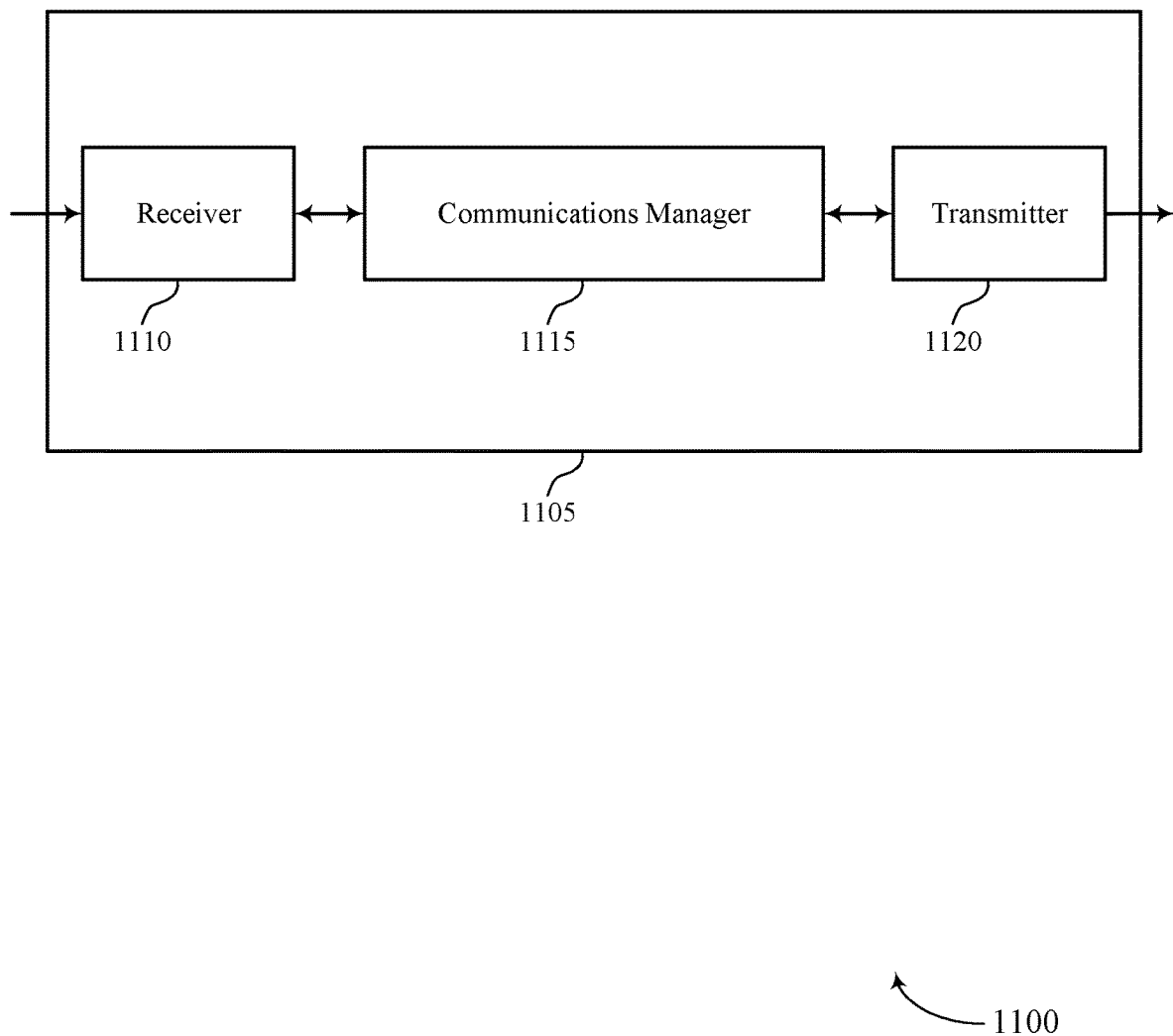
FIGS. 11 and 12 show block diagrams of devices that support SDM mapping of TCI states to a control channel in accordance with aspects of the present disclosure.

FIG. 11 shows a block diagram 1100 of a device 1105 that supports SDM mapping of TCI states to a control channel in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to SDM mapping of TCI states to a control channel). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify an association between resources of a CORESET for a downlink control channel and a set of TCI states for the CORESET based at least in part on an SDM mapping and transmit a configuration message indicating that the CORESET is associated with the set of TCI states. The communications manager 1115 may be an example of aspects of the communications manager 1410 described herein.

The communications manager 1115, or its sub-components, may be implemented in hardware, software (e.g., executed by a processor), or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
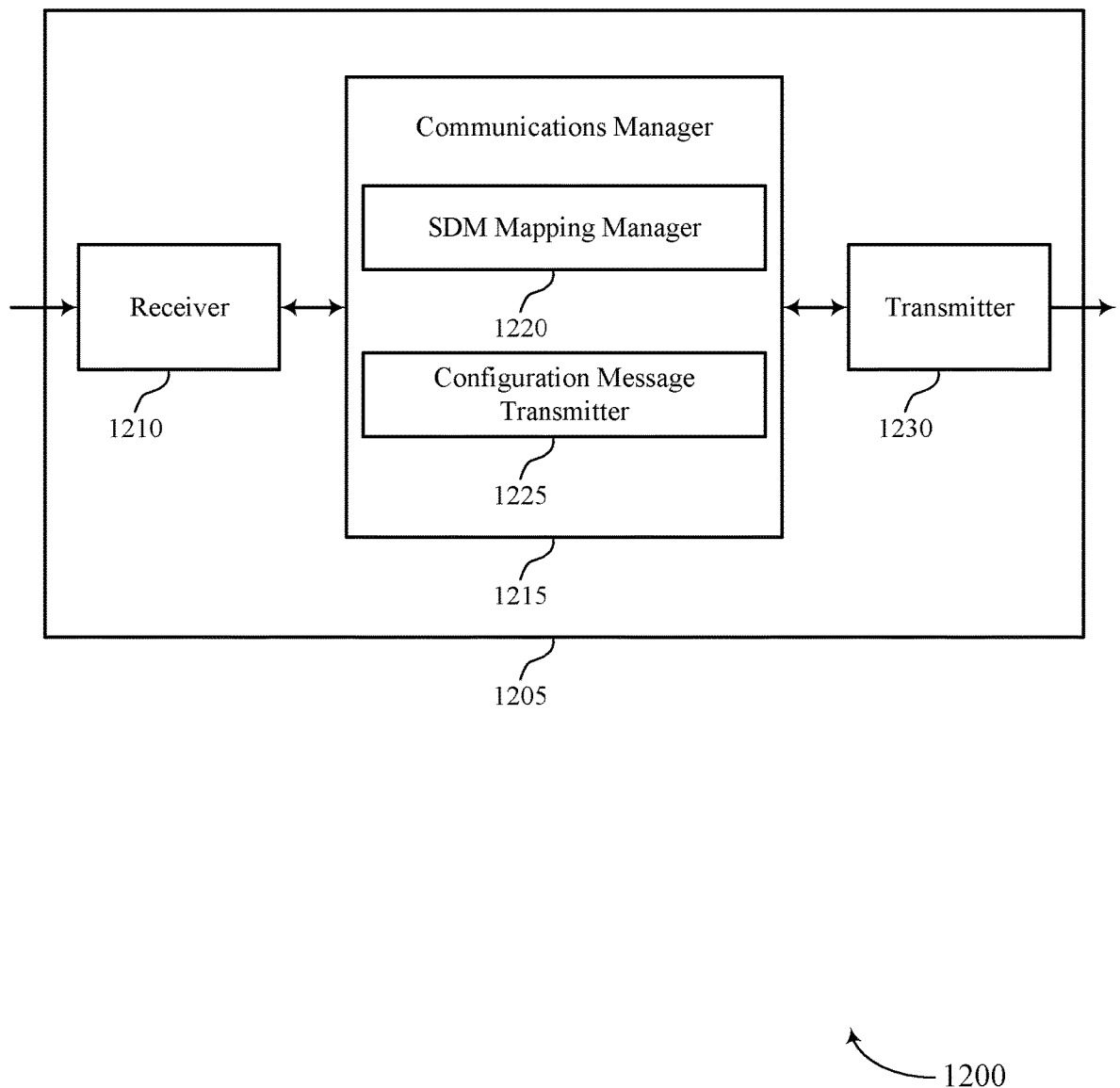

FIG. 12 shows a block diagram 1200 of a device 1205 that supports SDM mapping of TCI states to a control channel in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to SDM mapping of TCI states to a control channel). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SDM mapping manager 1220 and a configuration message transmitter 1225. The communications manager 1215 may be an example of aspects of the communications manager 1410 described herein.

The SDM mapping manager 1220 may identify an association between resources of a CORESET for a downlink control channel and a set of TCI states for the CORESET based at least in part on an SDM mapping. The configuration message transmitter 1225 may transmit a configuration message indicating that the CORESET is associated with the set of TCI states.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
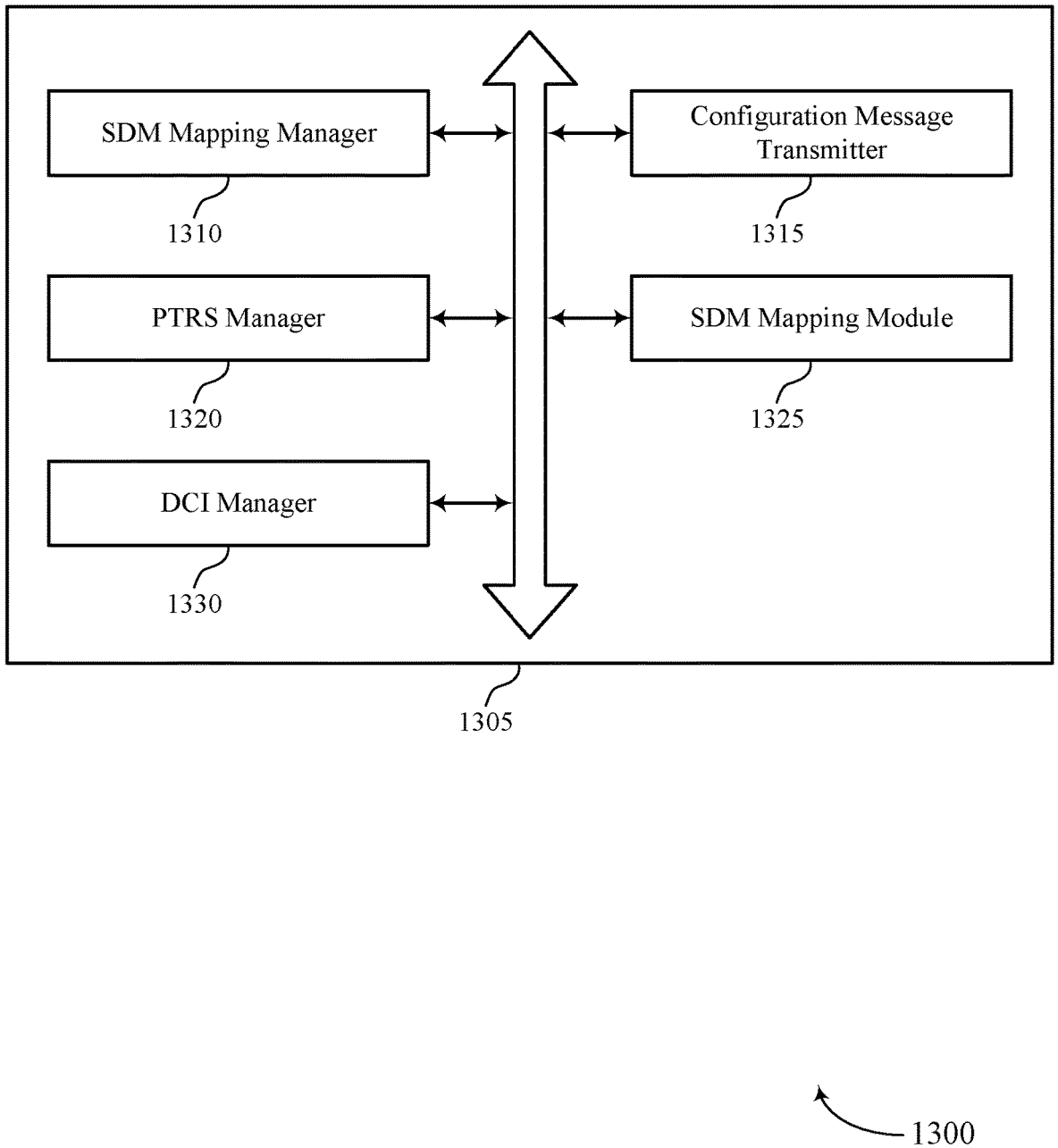
FIG. 13 shows a block diagram of a communications manager that supports SDM mapping of TCI states to a control channel in accordance with aspects of the present disclosure.

FIG. 13 shows a block diagram 1300 of a communications manager 1305 that supports SDM mapping of TCI states to a control channel in accordance with aspects of the present disclosure. The communications manager 1305 may be an example of aspects of a communications manager 1115, a communications manager 1215, or a communications manager 1410 described herein. The communications manager 1305 may include an SDM mapping manager 1310, a configuration message transmitter 1315, a PTRS manager 1320, an SDM mapping module 1325, and a DCI manager 1330. Each of these modules may communicate, directly or indirectly, with one another (e.g., via one or more buses).

The SDM mapping manager 1310 may identify an association between resources of a CORESET for a downlink control channel and a set of TCI states for the CORESET based at least in part on an SDM mapping. In some examples, identifying that the SDM mapping includes a first association between a first DMRS port and a first TCI state of the set of TCI states, and a second association between a second DMRS port and a second TCI state of the set of TCI states.

In some examples, the SDM mapping manager 1310 may identify that a first one or more REs of an REG in the CORESET are associated with a first DMRS port. In some examples, the SDM mapping manager 1310 may identify that a second one or more REs of the REG in the CORESET are associated with a second DMRS port. In some examples, the SDM mapping manager 1310 may identify that the first DMRS port is associated with a first TCI state of the set of TCI states and that the second DMRS port is associated with a second TCI state of the set of TCI states.

In some examples, the SDM mapping manager 1310 may identify that one or more REs of an REG in the CORESET are associated with a first DMRS port. In some examples, the SDM mapping manager 1310 may identify that the one or more REs of the REG in the CORESET are also associated with a second DMRS port, where the first DMRS port and the second DMRS port are orthogonal via code-division multiplexing. In some examples, the SDM mapping manager 1310 may identify that a first REG in the CORESET includes REs that are collectively associated with both a first DMRS port and a second DMRS port.

In some examples, the SDM mapping manager 1310 may identify that additional REGs in the CORESET also include REs that are collectively associated with both the first DMRS port and the second DMRS port. In some examples, the SDM mapping manager 1310 may identify that each REG in a first symbol of the CORESET includes REs that are collectively associated with both a first DMRS port and a second DMRS port. In some examples, the SDM mapping manager 1310 may identify that additional REGs in additional symbols of the CORESET do not include REs assigned for DMRSs. In some examples, the SDM mapping manager 1310 may identify that the one or more REs of the REG in the CORESET are also associated with a second DMRS port, where the first DMRS port and the second DMRS port are non-orthogonal but use different scrambling sequences.

In some cases, the first DMRS port and the second DMRS port are orthogonal. In some cases, the first DMRS port and the second DMRS port are non-orthogonal. In some cases, the first one or more REs of the REG are different from the second one or more REs of the REG. In some cases, a density of REs assigned for DMRSs in the REGs in the first symbol is based at least in part on a number of symbols in the CORESET.

The configuration message transmitter 1315 may transmit a configuration message indicating that the CORESET is associated with the set of TCI states. In some examples, the configuration message transmitter 1315 may transmit an indication of whether different REs of an REG in the CORESET are assigned to different DMRS ports or whether a same RE of the REG is assigned to two different DMRS ports. In some examples, the configuration message transmitter 1315 may transmit an indication of a number of DMRS ports configured for the CORESET.

The PTRS manager 1320 may identify that at least one of the additional symbols of the CORESET includes at least one PTRS. In some examples, the PTRS manager 1320 may transmit an indication of whether the at least one PTRS is for one port or two ports. In some examples, the PTRS manager 1320 may transmit an indication of a time-domain density of the at least one PTRS within the additional symbols of the CORESET. In some examples, the PTRS manager 1320 may transmit an indication of a frequency-domain density of the at least one PTRS within the additional REGs of the additional symbols of the CORESET.

In some cases, the at least one PTRS includes a first PTRS associated with the first DMRS port and a second PTRS associated with the second DMRS port. In some cases, the different scrambling sequences are based at least in part on a first DMRS scrambling identification that is associated with the first TCI state and a second DMRS scrambling identification that is associated with the second TCI state.

The DCI manager 1330 may transmit coded bits of a downlink control channel across a first layer and a second layer, where the first layer is associated with a first TCI state and the second layer is associated with the second TCI state. In some examples, the DCI manager 1330 may apply a scrambling sequence to the coded bits of DCI based at least in part on the layer across which the coded bits are transmitted.

Figure 14:
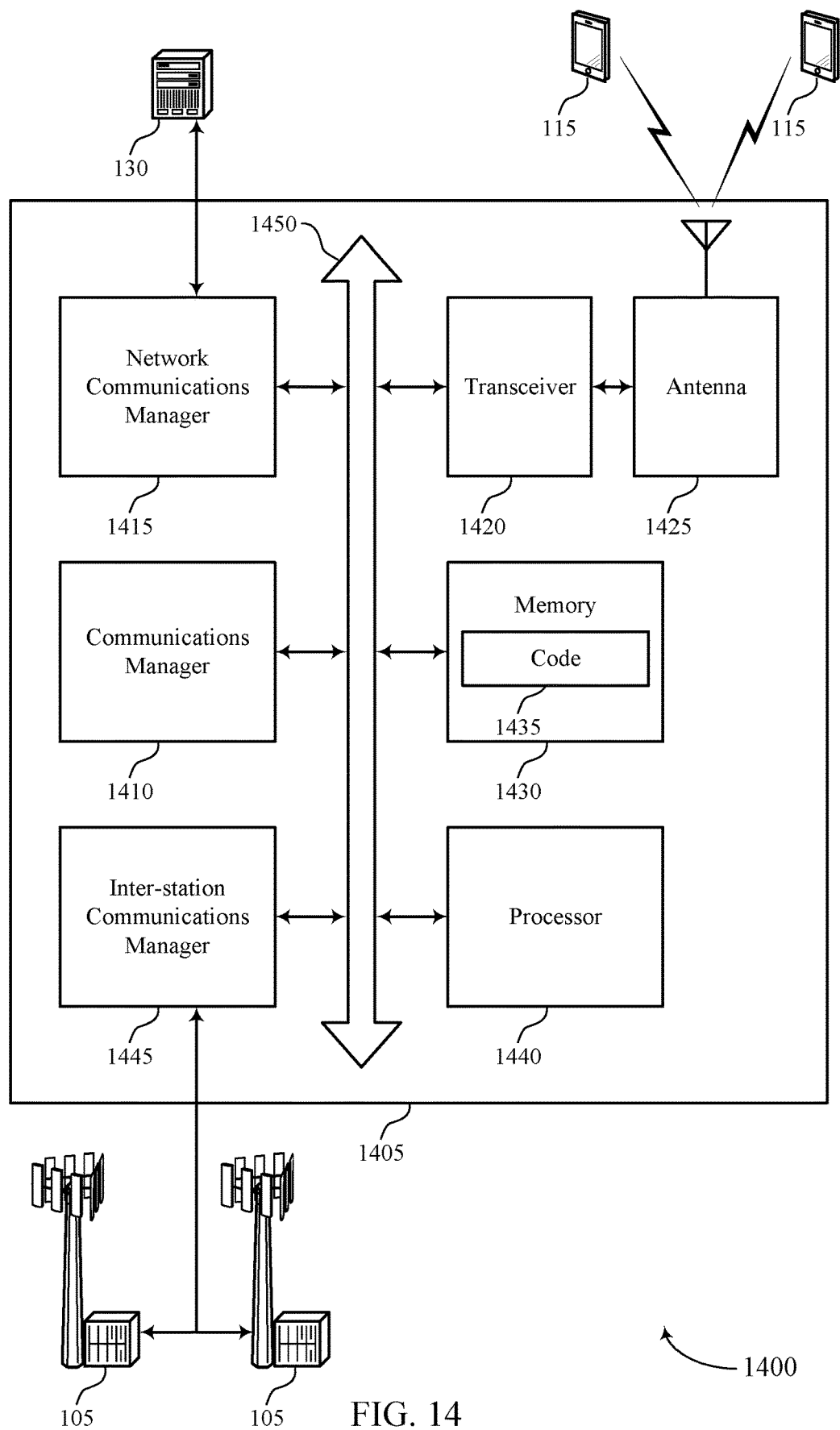
FIG. 14 shows a diagram of a system including a device that supports SDM mapping of TCI states to a control channel in accordance with aspects of the present disclosure.

FIG. 14 shows a diagram of a system 1400 including a device 1405 that supports SDM mapping of TCI states to a control channel in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify an association between resources of a CORESET for a downlink control channel and a set of TCI states for the CORESET based at least in part on an SDM mapping and transmit a configuration message indicating that the CORESET is associated with the set of TCI states.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting SDM mapping of TCI states to a control channel).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
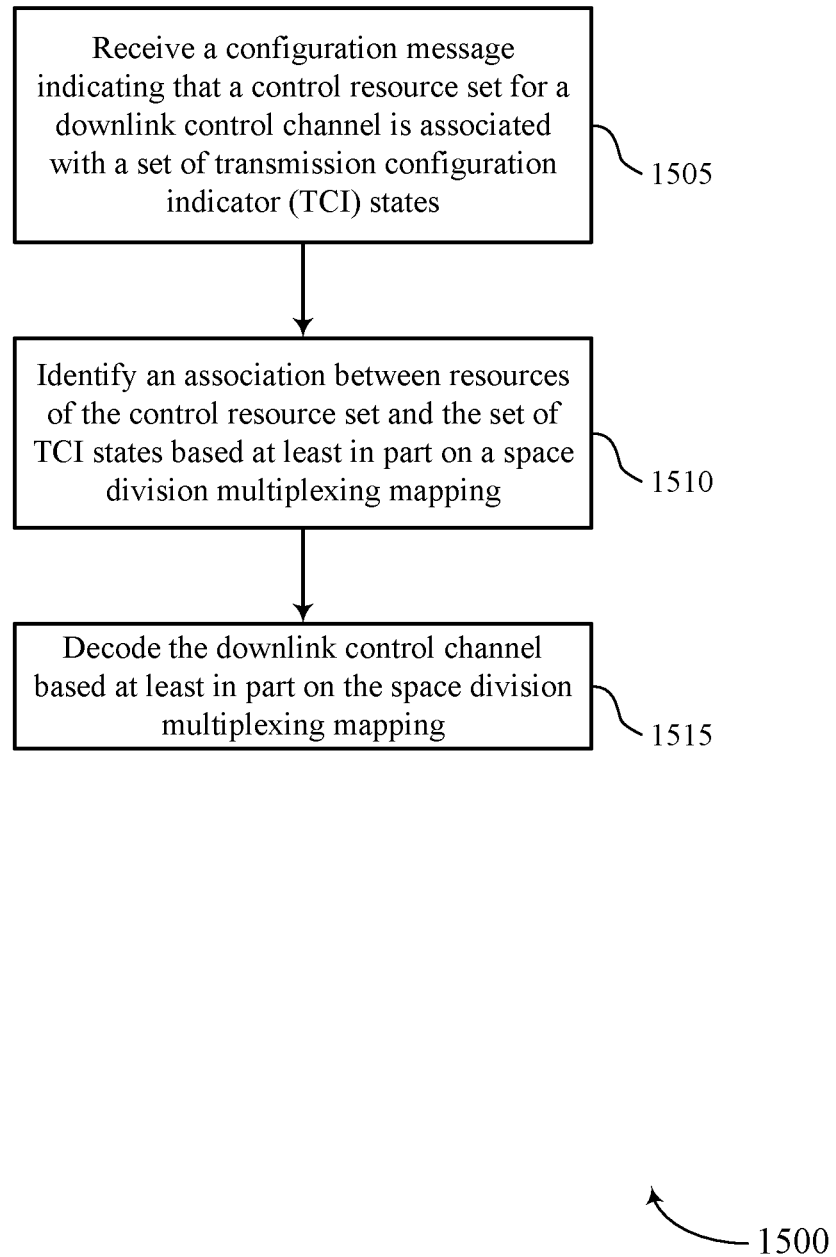
FIGS. 15 through 18 show flowcharts illustrating methods that support SDM mapping of TCI states to a control channel in accordance with aspects of the present disclosure.

FIG. 15 shows a flowchart illustrating a method 1500 that supports SDM mapping of TCI states to a control channel in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a configuration message indicating that a CORESET for a downlink control channel is associated with a set of TCI states. The operations of 1505 may be performed according to the methods described herein. In some examples, aspects of the operations of 1505 may be performed by a configuration message receiver as described with reference to FIGS. 7 through 10.

At 1510, the UE may identify an association between resources of the CORESET and the set of TCI states based at least in part on an SDM mapping. The operations of 1510 may be performed according to the methods described herein. In some examples, aspects of the operations of 1510 may be performed by an SDM mapping module as described with reference to FIGS. 7 through 10.

At 1515, the UE may decode the downlink control channel based at least in part on the SDM mapping. The operations of 1515 may be performed according to the methods described herein. In some examples, aspects of the operations of 1515 may be performed by a DCI decoder as described with reference to FIGS. 7 through 10.

Figure 16:
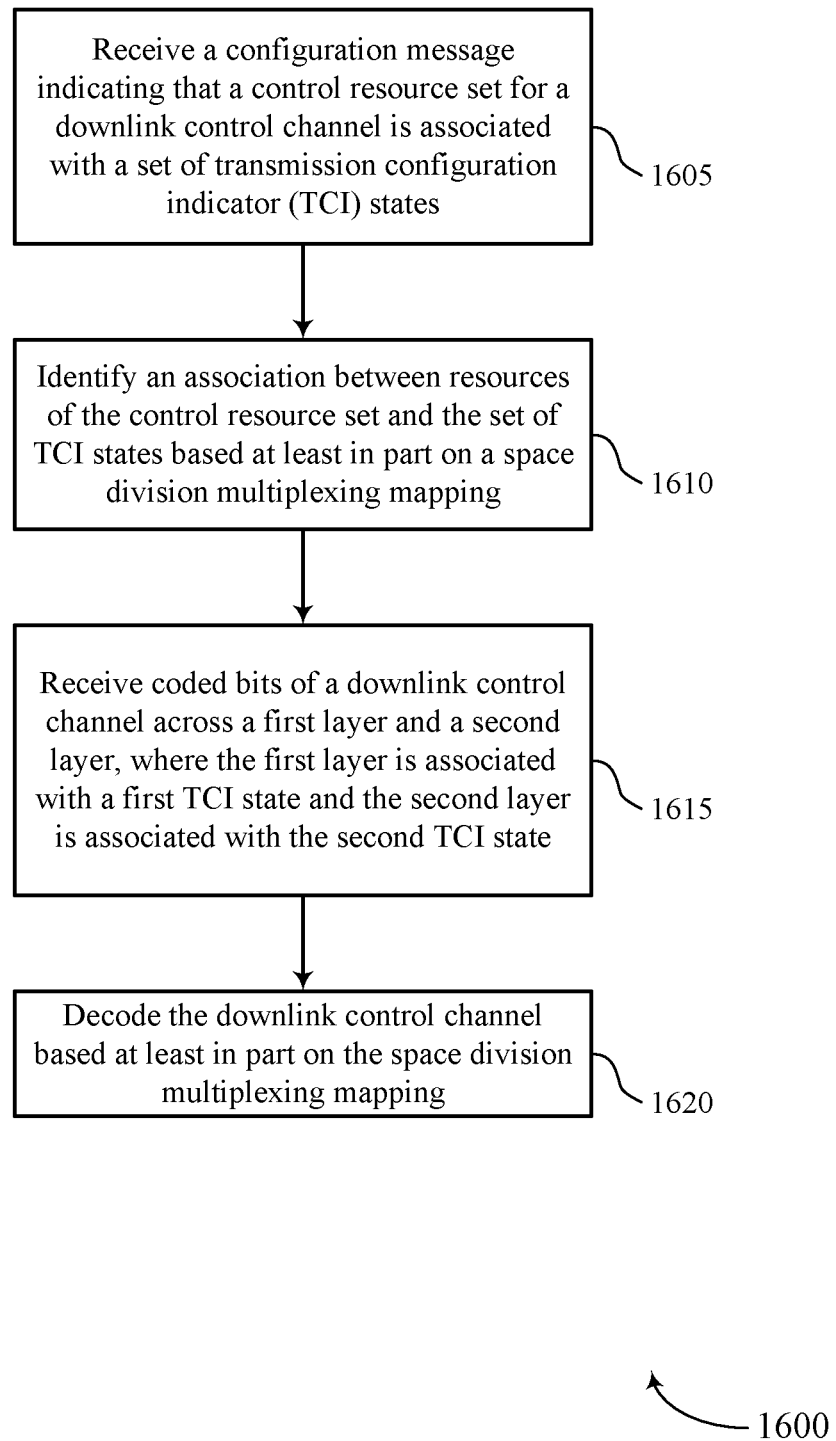

FIG. 16 shows a flowchart illustrating a method 1600 that supports SDM mapping of TCI states to a control channel in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a configuration message indicating that a CORESET for a downlink control channel is associated with a set of TCI states. The operations of 1605 may be performed according to the methods described herein. In some examples, aspects of the operations of 1605 may be performed by a configuration message receiver as described with reference to FIGS. 7 through 10.

At 1610, the UE may identify an association between resources of the CORESET and the set of TCI states based at least in part on an SDM mapping. The operations of 1610 may be performed according to the methods described herein. In some examples, aspects of the operations of 1610 may be performed by an SDM mapping module as described with reference to FIGS. 7 through 10.

At 1615, the UE may receive coded bits of a downlink control channel across a first layer and a second layer, where the first layer is associated with a first TCI state and the second layer is associated with the second TCI state. The operations of 1615 may be performed according to the methods described herein. In some examples, aspects of the operations of 1615 may be performed by a DCI module as described with reference to FIGS. 7 through 10.

At 1620, the UE may decode the downlink control channel based at least in part on the SDM mapping. The operations of 1620 may be performed according to the methods described herein. In some examples, aspects of the operations of 1620 may be performed by a DCI decoder as described with reference to FIGS. 7 through 10.

Figure 17:
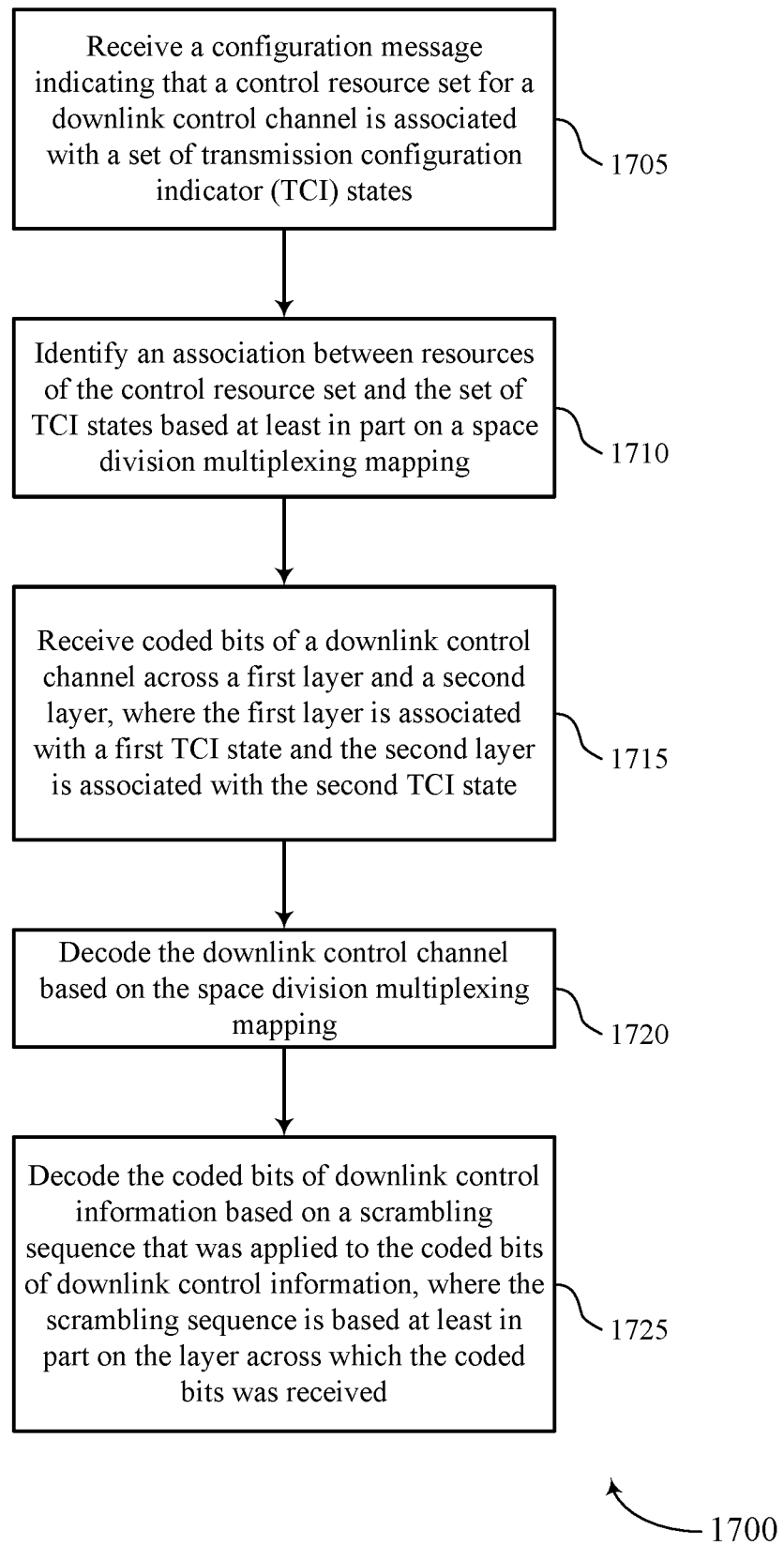

FIG. 17 shows a flowchart illustrating a method 1700 that supports SDM mapping of TCI states to a control channel in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a configuration message indicating that a CORESET for a downlink control channel is associated with a set of TCI states. The operations of 1705 may be performed according to the methods described herein. In some examples, aspects of the operations of 1705 may be performed by a configuration message receiver as described with reference to FIGS. 7 through 10.

At 1710, the UE may identify an association between resources of the CORESET and the set of TCI states based at least in part on an SDM mapping. The operations of 1710 may be performed according to the methods described herein. In some examples, aspects of the operations of 1710 may be performed by an SDM mapping module as described with reference to FIGS. 7 through 10.

At 1715, the UE may receive coded bits of a downlink control channel across a first layer and a second layer, where the first layer is associated with a first TCI state and the second layer is associated with the second TCI state. The operations of 1715 may be performed according to the methods described herein. In some examples, aspects of the operations of 1715 may be performed by a DCI module as described with reference to FIGS. 7 through 10.

At 1720, the UE may decode the downlink control channel based at least in part on the SDM mapping. The operations of 1720 may be performed according to the methods described herein. In some examples, aspects of the operations of 1720 may be performed by a DCI decoder as described with reference to FIGS. 7 through 10.

At 1725, the UE may decode the coded bits of DCI based at least in part on a scrambling sequence that was applied to the coded bits of DCI, where the scrambling sequence is based at least in part on the layer across which the coded bits was received. The operations of 1725 may be performed according to the methods described herein. In some examples, aspects of the operations of 1725 may be performed by a DCI module as described with reference to FIGS. 7 through 10.

Figure 18:
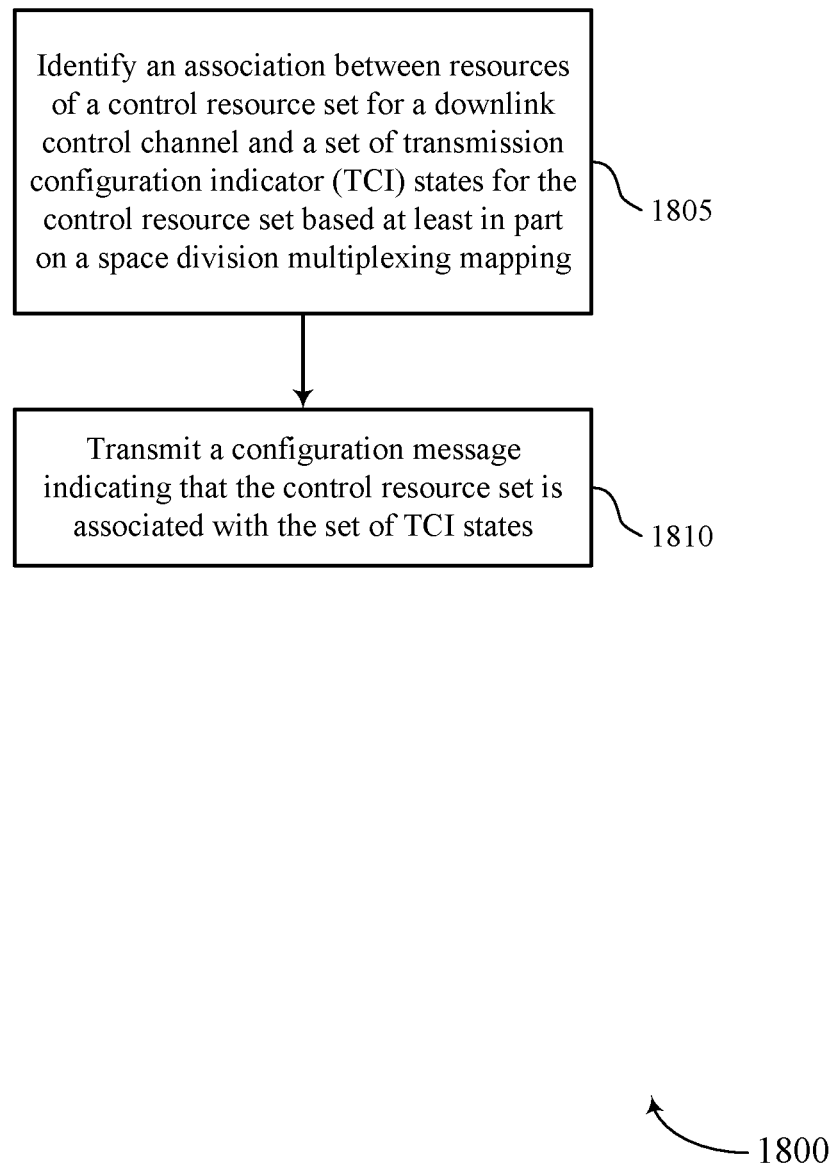

FIG. 18 shows a flowchart illustrating a method 1800 that supports SDM mapping of TCI states to a control channel in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may identify an association between resources of a CORESET for a downlink control channel and a set of TCI states for the CORESET based at least in part on an SDM mapping. The operations of 1805 may be performed according to the methods described herein. In some examples, aspects of the operations of 1805 may be performed by an SDM mapping manager as described with reference to FIGS. 11 through 14.

At 1810, the base station may transmit a configuration message indicating that the CORESET is associated with the set of TCI states. The operations of 1810 may be performed according to the methods described herein. In some examples, aspects of the operations of 1810 may be performed by a configuration message transmitter as described with reference to FIGS. 11 through 14.

The following provides an overview of aspects of the present disclosure:

Aspect 1: A method for wireless communications at a UE, comprising: receiving a configuration message indicating that a control resource set for a downlink control channel is associated with a plurality of transmission configuration indicator (TCI) states; identifying an association between resources of the control resource set and the plurality of TCI states based at least in part on a space division multiplexing mapping; and decoding the downlink control channel based at least in part on the space division multiplexing mapping.

Aspect 2: The method of aspect 1, wherein identifying the association between resources of the control resource set and the plurality of TCI states comprises: identifying that the space division multiplexing mapping comprises a first association between a first demodulation reference signal port and a first TCI state of the plurality of TCI states, and a second association between a second demodulation reference signal port and a second TCI state of the plurality of TCI states.

Aspect 3: The method of aspect 2, wherein the first demodulation reference signal port and the second demodulation reference signal port are orthogonal.

Aspect 4: The method of aspect 2, wherein the first demodulation reference signal port and the second demodulation reference signal port are non-orthogonal.

Aspect 5: The method of any of aspects 1 through 4, wherein identifying the association between resources of the control resource set and the plurality of TCI states comprises: identifying that a first one or more resource elements of a resource element group in the control resource set are associated with a first demodulation reference signal port; identifying that a second one or more resource elements of the resource element group in the control resource set are associated with a second demodulation reference signal port; and identifying that the first demodulation reference signal port is associated with a first TCI state of the plurality of TCI states and that the second demodulation reference signal port is associated with a second TCI state of the plurality of TCI states.

Aspect 6: The method of aspect 5, wherein the first one or more resource elements of the resource element group are different from the second one or more resource elements of the resource element group.

Aspect 7: The method of any of aspects 1 through 6, wherein identifying the association between resources of the control resource set and the plurality of TCI states comprises: identifying that one or more resource elements of a resource element group in the control resource set are associated with a first demodulation reference signal port; identifying that the one or more resource elements of the resource element group in the control resource set are also associated with a second demodulation reference signal port, wherein the first demodulation reference signal port and the second demodulation reference signal port are orthogonal via code-division multiplexing; and identifying that the first demodulation reference signal port is associated with a first TCI state of the plurality of TCI states and that the second demodulation reference signal port is associated with a second TCI state of the plurality of TCI states.

Aspect 8: The method of any of aspects 1 through 7, wherein receiving the configuration message further comprises: receiving an indication of whether different resource elements of a resource element group in the control resource set are assigned to different demodulation reference signal ports or whether a same resource element of the resource element group is assigned to two different demodulation reference signal ports.

Aspect 9: The method of any of aspects 1 through 8, wherein receiving the configuration message further comprises: receiving an indication of a number of demodulation reference signal ports configured for the control resource set.

Aspect 10: The method of any of aspects 1 through 9, wherein identifying the association between resources of the control resource set and the plurality of TCI states comprises: identifying that each element group in each symbol of the control resource set includes one or more resource elements that are associated with a first demodulation reference signal port and one or more resource elements that are associated with a second demodulation reference signal port; and identifying that the first demodulation reference signal port is associated with a first TCI state of the plurality of TCI states and that the second demodulation reference signal port is associated with a second TCI state of the plurality of TCI states.

Aspect 11: The method of any of aspects 1 through 10, wherein identifying the association between resources of the control resource set and the plurality of TCI states comprises: identifying that each resource element group in a first symbol of the control resource set includes one or more resource elements that are associated with a first demodulation reference signal port and one or more resource elements that are associated with a second demodulation reference signal port; identifying that additional resource element groups in additional symbols of the control resource set do not include resource elements assigned for demodulation reference signals; and identifying that the first demodulation reference signal port is associated with a first TCI state of the plurality of TCI states and that the second demodulation reference signal port is associated with a second TCI state of the plurality of TCI states.

Aspect 12: The method of aspect 11, wherein a density of the one or more resource elements assigned for demodulation reference signals in the resource element groups in the first symbol is based at least in part on a number of symbols in the control resource set.

Aspect 13: The method of any of aspects 11 through 12, further comprising: identifying that at least one of the additional symbols of the control resource set includes at least one phase tracking reference signal.

Aspect 14: The method of aspect 13, wherein the at least one phase tracking reference signal comprises a first phase tracking reference signal associated with the first demodulation reference signal port and a second phase tracking reference signal associated with the second demodulation reference signal port.

Aspect 15: The method of any of aspects 13 through 14, wherein receiving the configuration message further comprises: receiving an indication of whether the at least one phase tracking reference signal is for one port or two ports.

Aspect 16: The method of any of aspects 13 through 15, wherein receiving the configuration message further comprises: receiving an indication of a time-domain density of the at least one phase tracking reference signal within the additional symbols of the control resource set.

Aspect 17: The method of any of aspects 13 through 16, wherein receiving the configuration message further comprises: receiving an indication of a frequency-domain density of the at least one phase tracking reference signal within the additional resource element groups of the additional symbols of the control resource set.

Aspect 18: The method of any of aspects 1 through 17, wherein identifying the association between resources of the control resource set and the plurality of TCI states comprises: identifying that one or more resource elements of a resource element group in the control resource set are associated with a first demodulation reference signal port; identifying that the one or more resource elements of the resource element group in the control resource set are also associated with a second demodulation reference signal port, wherein the first demodulation reference signal port and the second demodulation reference signal port are non-orthogonal but use different scrambling sequences; and identifying that the first demodulation reference signal port is associated with a first TCI state of the plurality of TCI states and that the second demodulation reference signal port is associated with a second TCI state of the plurality of TCI states.

Aspect 19: The method of aspect 18, wherein the different scrambling sequences are based at least in part on a first demodulation reference signal scrambling identification that is associated with the first TCI state and a second demodulation reference signal scrambling identification that is associated with the second TCI state.

Aspect 20: The method of any of aspects 1 through 19, further comprising: receiving coded bits of the downlink control channel across a first layer and a second layer, wherein the first layer is associated with a first TCI state and the second layer is associated with a second TCI state.

Aspect 21: The method of aspect 20, further comprising: decoding the coded bits of downlink control information based at least in part on a scrambling sequence that was applied to the coded bits of downlink control information, wherein the scrambling sequence is based at least in part on the layer across which the coded bits was received.

Aspect 22: A method for wireless communications at a base station, comprising: identifying an association between resources of a control resource set for a downlink control channel and a plurality of transmission configuration indicator (TCI) states for the control resource set based at least in part on a space division multiplexing mapping; and transmitting a configuration message indicating that the control resource set is associated with the plurality of TCI states.

Aspect 23: The method of aspect 22, wherein identifying the association between resources of the control resource set and the plurality of TCI states comprises: identifying that the space division multiplexing mapping comprises a first association between a first demodulation reference signal port and a first TCI state of the plurality of TCI states, and a second association between a second demodulation reference signal port and a second TCI state of the plurality of TCI states.

Aspect 24: The method of aspect 23, wherein the first demodulation reference signal port and the second demodulation reference signal port are orthogonal.

Aspect 25: The method of aspect 23, wherein the first demodulation reference signal port and the second demodulation reference signal port are non-orthogonal.

Aspect 26: The method of any of aspects 22 through 25, wherein identifying the association between resources of the control resource set and the plurality of TCI states comprises: identifying that a first one or more resource elements of a resource element group in the control resource set are associated with a first demodulation reference signal port; identifying that a second one or more resource elements of the resource element group in the control resource set are associated with a second demodulation reference signal port; and identifying that the first demodulation reference signal port is associated with a first TCI state of the plurality of TCI states and that the second demodulation reference signal port is associated with a second TCI state of the plurality of TCI states.

Aspect 27: The method of aspect 26, wherein the first one or more resource elements of the resource element group are different from the second one or more resource elements of the resource element group.

Aspect 28: The method of any of aspects 22 through 27, wherein identifying the association between resources of the control resource set and the plurality of TCI states comprises: identifying that one or more resource elements of a resource element group in the control resource set are associated with a first demodulation reference signal port; identifying that the one or more resource elements of the resource element group in the control resource set are also associated with a second demodulation reference signal port, wherein the first demodulation reference signal port and the second demodulation reference signal port are orthogonal via code-division multiplexing; and identifying that the first demodulation reference signal port is associated with a first TCI state of the plurality of TCI states and that the second demodulation reference signal port is associated with a second TCI state of the plurality of TCI states.

Aspect 29: The method of any of aspects 22 through 28, wherein transmitting the configuration message further comprises: transmitting an indication of whether different resource elements of a resource element group in the control resource set are assigned to different demodulation reference signal ports or whether a same resource element of the resource element group is assigned to two different demodulation reference signal ports.

Aspect 30: The method of any of aspects 22 through 29, wherein transmitting the configuration message further comprises: transmitting an indication of a number of demodulation reference signal ports configured for the control resource set.

Aspect 31: The method of any of aspects 22 through 30, wherein identifying the association between resources of the control resource set and the plurality of TCI states comprises: identifying that a first resource element group in the control resource set includes resource elements that are collectively associated with both a first demodulation reference signal port and a second demodulation reference signal port; identifying that additional resource element groups in the control resource set also include resource elements that are collectively associated with both the first demodulation reference signal port and the second demodulation reference signal port; and identifying that the first demodulation reference signal port is associated with a first TCI state of the plurality of TCI states and that the second demodulation reference signal port is associated with a second TCI state of the plurality of TCI states.

Aspect 32: The method of any of aspects 22 through 31, wherein identifying the association between resources of the control resource set and the plurality of TCI states comprises: identifying that each resource element group in a first symbol of the control resource set includes resource elements that are collectively associated with both a first demodulation reference signal port and a second demodulation reference signal port; identifying that additional resource element groups in additional symbols of the control resource set do not include resource elements assigned for demodulation reference signals; and identifying that the first demodulation reference signal port is associated with a first TCI state of the plurality of TCI states and that the second demodulation reference signal port is associated with a second TCI state of the plurality of TCI states.

Aspect 33: The method of aspect 32, wherein a density of resource elements assigned for demodulation reference signals in the resource element groups in the first symbol is based at least in part on a number of symbols in the control resource set.

Aspect 34: The method of any of aspects 32 through 33, further comprising: identifying that at least one of the additional symbols of the control resource set includes at least one phase tracking reference signal.

Aspect 35: The method of aspect 34, wherein the at least one phase tracking reference signal comprises a first phase tracking reference signal associated with the first demodulation reference signal port and a second phase tracking reference signal associated with the second demodulation reference signal port.

Aspect 36: The method of any of aspects 34 through 35, wherein transmitting the configuration message further comprises: transmitting an indication of whether the at least one phase tracking reference signal is for one port or two ports.

Aspect 37: The method of any of aspects 34 through 36, wherein transmitting the configuration message further comprises: transmitting an indication of a time-domain density of the at least one phase tracking reference signal within the additional symbols of the control resource set.

Aspect 38: The method of any of aspects 34 through 37, wherein transmitting the configuration message further comprises: transmitting an indication of a frequency-domain density of the at least one phase tracking reference signal within the additional resource element groups of the additional symbols of the control resource set.

Aspect 39: The method of any of aspects 22 through 38, wherein identifying the association between resources of the control resource set and the plurality of TCI states comprises: identifying that one or more resource elements of a resource element group in the control resource set are associated with a first demodulation reference signal port; identifying that the one or more resource elements of the resource element group in the control resource set are also associated with a second demodulation reference signal port, wherein the first demodulation reference signal port and the second demodulation reference signal port are non-orthogonal but use different scrambling sequences; and identifying that the first demodulation reference signal port is associated with a first TCI state of the plurality of TCI states and that the second demodulation reference signal port is associated with a second TCI state of the plurality of TCI states.

Aspect 40: The method of aspect 39, wherein the different scrambling sequences are based at least in part on a first demodulation reference signal scrambling identification that is associated with the first TCI state and a second demodulation reference signal scrambling identification that is associated with the second TCI state.

Aspect 41: The method of any of aspects 22 through 40, further comprising: transmitting coded bits of the downlink control channel across a first layer and a second layer, wherein the first layer is associated with a first TCI state and the second layer is associated with a second TCI state.

Aspect 42: The method of aspect 41, further comprising: applying a scrambling sequence to the coded bits of downlink control information based at least in part on the layer across which the coded bits are transmitted.

Aspect 43: An apparatus for wireless communications at a UE, comprising a processor; memory coupled with the processor; and instructions stored in the memory and executable by the processor to cause the apparatus to perform a method of any of aspects 1 through 21.

Aspect 44: An apparatus for wireless communications at a UE, comprising at least one means for performing a method of any of aspects 1 through 21.

Aspect 45: A non-transitory computer-readable medium storing code for wireless communications at a UE, the code comprising instructions executable by a processor to perform a method of any of aspects 1 through 21.

Aspect 46: An apparatus for wireless communications at a base station, comprising a processor; memory coupled with the processor; and instructions stored in the memory and executable by the processor to cause the apparatus to perform a method of any of aspects 22 through 42.

Aspect 47: An apparatus for wireless communications at a base station, comprising at least one means for performing a method of any of aspects 22 through 42.

Aspect 48: A non-transitory computer-readable medium storing code for wireless communications at a base station, the code comprising instructions executable by a processor to perform a method of any of aspects 22 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a configuration message indicating that a control resource set for a downlink control channel is associated with a plurality of transmission configuration indicator (TCI) states;
    identifying an association between resources of the control resource set and the plurality of TCI states based at least in part on a space division multiplexing mapping, wherein each resource element group in a first symbol of the control resource set includes one or more resource elements that are associated with a first demodulation reference signal port and one or more resource elements that are associated with a second demodulation reference signal port, wherein additional resource element groups in additional symbols of the control resource set do not include resource elements assigned for demodulation reference signals, and wherein the first demodulation reference signal port is associated with a first TCI state of the plurality of TCI states and the second demodulation reference signal port is associated with a second TCI state of the plurality of TCI states; and
    decoding the downlink control channel based at least in part on the space division multiplexing mapping.

2. The method of claim 1, wherein identifying the association between resources of the control resource set and the plurality of TCI states comprises:
    identifying that the space division multiplexing mapping comprises a first association between the first demodulation reference signal port and the first TCI state of the plurality of TCI states, and a second association between the second demodulation reference signal port and the second TCI state of the plurality of TCI states.

3. The method of claim 1, wherein identifying the association between resources of the control resource set and the plurality of TCI states comprises:
    identifying that a first one or more resource elements of a resource element group in the control resource set are associated with the first demodulation reference signal port;
    identifying that a second one or more resource elements of the resource element group in the control resource set are associated with the second demodulation reference signal port; and
    identifying that the first demodulation reference signal port is associated with the first TCI state of the plurality of TCI states and that the second demodulation reference signal port is associated with the second TCI state of the plurality of TCI states.

4. The method of claim 3, wherein the first one or more resource elements of the resource element group are different from the second one or more resource elements of the resource element group.

5. The method of claim 1, wherein identifying the association between resources of the control resource set and the plurality of TCI states comprises:
    identifying that one or more resource elements of a resource element group in the control resource set are associated with the first demodulation reference signal port;
    identifying that the one or more resource elements of the resource element group in the control resource set are also associated with the second demodulation reference signal port, wherein the first demodulation reference signal port and the second demodulation reference signal port are orthogonal via code-division multiplexing; and identifying that the first demodulation reference signal port is associated with the first TCI state of the plurality of TCI states and that the second demodulation reference signal port is associated with the second TCI state of the plurality of TCI states.

6. The method of claim 1, wherein receiving the configuration message further comprises:

receiving an indication of whether different resource elements of a resource element group in the control resource set are assigned to different demodulation reference signal ports or whether a same resource element of the resource element group is assigned to two different demodulation reference signal ports.

7. The method of claim 1, wherein receiving the configuration message further comprises:

receiving an indication of a number of demodulation reference signal ports configured for the control resource set.

8. The method of claim 1, wherein identifying the association between resources of the control resource set and the plurality of TCI states comprises:

identifying that each resource element group in each symbol of the control resource set includes one or more resource elements that are associated with the first demodulation reference signal port and one or more resource elements that are associated with the second demodulation reference signal port; and identifying that the first demodulation reference signal port is associated with the first TCI state of the plurality of TCI states and that the second demodulation reference signal port is associated with the second TCI state of the plurality of TCI states.

9. The method of claim 1, wherein a density of the one or more resource elements assigned for demodulation reference signals in the resource element groups in the first symbol is based at least in part on a number of symbols in the control resource set.

10. The method of claim 1, further comprising:

identifying that at least one of the additional symbols of the control resource set includes at least one phase tracking reference signal.

11. The method of claim 10, wherein the at least one phase tracking reference signal comprises a first phase tracking reference signal associated with the first demodulation reference signal port and a second phase tracking reference signal associated with the second demodulation reference signal port.

12. The method of claim 10, wherein receiving the configuration message further comprises:

receiving an indication of whether the at least one phase tracking reference signal is for one port or two ports.

13. The method of claim 10, wherein receiving the configuration message further comprises:

receiving an indication of a time-domain density of the at least one phase tracking reference signal within the additional symbols of the control resource set; and receiving an indication of a frequency-domain density of the at least one phase tracking reference signal within the additional resource element groups of the additional symbols of the control resource set.

14. The method of claim 1, wherein identifying the association between resources of the control resource set and the plurality of TCI states comprises:

identifying that one or more resource elements of a resource element group in the control resource set are associated with the first demodulation reference signal port;

identifying that the one or more resource elements of the resource element group in the control resource set are also associated with the second demodulation reference signal port, wherein the first demodulation reference signal port and the second demodulation reference signal port are non-orthogonal but use different scrambling sequences; and identifying that the first demodulation reference signal port is associated with the first TCI state of the plurality of TCI states and that the second demodulation reference signal port is associated with the second TCI state of the plurality of TCI states.

15. The method of claim 14, wherein the different scrambling sequences are based at least in part on a first demodulation reference signal scrambling identification that is associated with the first TCI state and a second demodulation reference signal scrambling identification that is associated with the second TCI state.

16. The method of claim 1, further comprising:

receiving coded bits of the downlink control channel across a first layer and a second layer, wherein the first layer is associated with the first TCI state and the second layer is associated with the second TCI state; and decoding the coded bits of downlink control information based at least in part on a scrambling sequence that was applied to the coded bits of downlink control information, wherein the scrambling sequence is based at least in part on the layer across which the coded bits was received.

17. A method for wireless communications at a network device, comprising:

identifying an association between resources of a control resource set for a downlink control channel and a plurality of transmission configuration indicator (TCI) states for the control resource set based at least in part on a space division multiplexing mapping, wherein each resource element group in a first symbol of the control resource set includes resource elements that are collectively associated with both a first demodulation reference signal port and a second demodulation reference signal port, wherein additional resource element groups in additional symbols of the control resource set do not include resource elements assigned for demodulation reference signals, and wherein the first demodulation reference signal port is associated with a first TCI state of the plurality of TCI states and the second demodulation reference signal port is associated with a second TCI state of the plurality of TCI states; and transmitting a configuration message indicating that the control resource set is associated with the plurality of TCI states.

18. The method of claim 17, wherein identifying the association between resources of the control resource set and the plurality of TCI states comprises:

identifying that the space division multiplexing mapping comprises a first association between the first demodulation reference signal port and the first TCI state of the plurality of TCI states, and a second association between the second demodulation reference signal port and the second TCI state of the plurality of TCI states.

19. The method of claim 17, wherein identifying the association between resources of the control resource set and the plurality of TCI states comprises:
- identifying that a first one or more resource elements of a resource element group in the control resource set are associated with the first demodulation reference signal port;
- identifying that a second one or more resource elements of the resource element group in the control resource set are associated with the second demodulation reference signal port; and
- identifying that the first demodulation reference signal port is associated with the first TCI state of the plurality of TCI states and that the second demodulation reference signal port is associated with the second TCI state of the plurality of TCI states.

20. The method of claim 19, wherein the first one or more resource elements of the resource element group are different from the second one or more resource elements of the resource element group.

21. The method of claim 17, wherein identifying the association between resources of the control resource set and the plurality of TCI states comprises:
- identifying that one or more resource elements of a resource element group in the control resource set are associated with the first demodulation reference signal port;
- identifying that the one or more resource elements of the resource element group in the control resource set are also associated with the second demodulation reference signal port, wherein the first demodulation reference signal port and the second demodulation reference signal port are orthogonal via code-division multiplexing; and
- identifying that the first demodulation reference signal port is associated with the first TCI state of the plurality of TCI states and that the second demodulation reference signal port is associated with the second TCI state of the plurality of TCI states.

22. The method of claim 17, wherein transmitting the configuration message further comprises:
- transmitting an indication of whether different resource elements of a resource element group in the control resource set are assigned to different demodulation reference signal ports or whether a same resource element of the resource element group is assigned to two different demodulation reference signal ports.

23. The method of claim 17, wherein transmitting the configuration message further comprises:
- transmitting an indication of a number of demodulation reference signal ports configured for the control resource set.

24. The method of claim 17, wherein identifying the association between resources of the control resource set and the plurality of TCI states comprises:
- identifying that a first resource element group in the control resource set includes resource elements that are collectively associated with both the first demodulation reference signal port and the second demodulation reference signal port;
- identifying that additional resource element groups in the control resource set also include resource elements that are collectively associated with both the first demodulation reference signal port and the second demodulation reference signal port; and
- identifying that the first demodulation reference signal port is associated with the first TCI state of the plurality of TCI states and that the second demodulation reference signal port is associated with the second TCI state of the plurality of TCI states.

25. The method of claim 17, wherein identifying the association between resources of the control resource set and the plurality of TCI states comprises:
- identifying that one or more resource elements of a resource element group in the control resource set are associated with the first demodulation reference signal port;
- identifying that the one or more resource elements of the resource element group in the control resource set are also associated with the second demodulation reference signal port, wherein the first demodulation reference signal port and the second demodulation reference signal port are non-orthogonal but use different scrambling sequences; and
- identifying that the first demodulation reference signal port is associated with the first TCI state of the plurality of TCI states and that the second demodulation reference signal port is associated with the second TCI state of the plurality of TCI states.

26. The method of claim 17, further comprising:
- transmitting coded bits of the downlink control channel across a first layer and a second layer, wherein the first layer is associated with the first TCI state and the second layer is associated with the second TCI state; and
- applying a scrambling sequence to the coded bits of downlink control information based at least in part on the layer across which the coded bits are transmitted.

27. An apparatus for wireless communications at a user equipment (UE), comprising:
- at least one processor, and
- memory coupled to the at least one processor, the memory storing instructions executable by the at least one processor to cause the UE to:
  - receive a configuration message indicating that a control resource set for a downlink control channel is associated with a plurality of transmission configuration indicator (TCI) states;
  - identify an association between resources of the control resource set and the plurality of TCI states based at least in part on a space division multiplexing mapping, wherein each resource element group in a first symbol of the control resource set includes one or more resource elements that are associated with a first demodulation reference signal port and one or more resource elements that are associated with a second demodulation reference signal port, wherein additional resource element groups in additional symbols of the control resource set do not include resource elements assigned for demodulation reference signals, and wherein the first demodulation reference signal port is associated with a first TCI state of the plurality of TCI states and the second demodulation reference signal port is associated with a second TCI state of the plurality of TCI states; and
  - decode the downlink control channel based at least in part on the space division multiplexing mapping.

28. An apparatus for wireless communications at a network device, comprising:
- at least one processor, and
- memory coupled to the at least one processor, the memory storing instructions executable by the at least one processor to cause the network device to:

identify an association between resources of a control resource set for a downlink control channel and a plurality of transmission configuration indicator (TCI) states for the control resource set based at least in part on a space division multiplexing mapping, wherein each resource element group in a first symbol of the control resource set includes resource elements that are collectively associated with both a first demodulation reference signal port and a second demodulation reference signal port, wherein additional resource element groups in additional symbols of the control resource set do not include resource elements assigned for demodulation reference signals, and wherein the first demodulation reference signal port is associated with a first TCI state of the plurality of TCI states and the second demodulation reference signal port is associated with a second TCI state of the plurality of TCI states; and transmit a configuration message indicating that the control resource set is associated with the plurality of TCI states.

\* \* \* \* \*